US009801126B2

United States Patent
Kennedy et al.

(10) Patent No.: US 9,801,126 B2
(45) Date of Patent: Oct. 24, 2017

(54) CONFIGURABLE COMMUNICATION MODULES FOR FLEXIBLE COMMUNICATIONS WITHIN AN ENERGY-LIMITED WIRELESS SYSTEM

(71) Applicants: Irwin Kennedy, Londonderry (IE); Howard Huang, New York, NY (US); Chih-Kuang Lin, Dublin (IE); Vijay Venkateswaran, Dublin (IE)

(72) Inventors: Irwin Kennedy, Londonderry (IE); Howard Huang, New York, NY (US); Chih-Kuang Lin, Dublin (IE); Vijay Venkateswaran, Dublin (IE)

(73) Assignee: Alcatel Lucent, Boulogne-Billancourt (FR)

( * ) Notice: Subject to any disclaimer, the term of this patent is extended or adjusted under 35 U.S.C. 154(b) by 285 days.

(21) Appl. No.: 14/526,083

(22) Filed: Oct. 28, 2014

(65) Prior Publication Data
US 2016/0119865 A1 Apr. 28, 2016

(51) Int. Cl.
*H04W 52/02* (2009.01)
*H04W 72/04* (2009.01)
*H04W 28/02* (2009.01)

(52) U.S. Cl.
CPC ... *H04W 52/0206* (2013.01); *H04W 28/0221* (2013.01); *H04W 52/0229* (2013.01); *H04W 72/0406* (2013.01); *Y02B 60/50* (2013.01)

(58) Field of Classification Search
CPC .............. H04B 1/3805; H04L 5/0055; H04M 15/7657; H04W 24/02; H04W 28/0221;
(Continued)

(56) References Cited

U.S. PATENT DOCUMENTS

2007/0232366 A1* 10/2007 Chen ................. H04W 52/0216
455/574
2009/0124304 A1 5/2009 Twitchell, Jr.
(Continued)

OTHER PUBLICATIONS

International Search Report and Written Opinion of corresponding PCT Application PCT/IB2015/002146, dated Apr. 12, 2016, 11 pages.

*Primary Examiner* — Alpus H Hsu
*Assistant Examiner* — Dharmesh Patel
(74) *Attorney, Agent, or Firm* — Tong, Rea, Bentley & Kim, LLC

(57) ABSTRACT

A capability for flexible communications within an energy-limited wireless system is presented. An energy-limited wireless node includes a communication module configured to switch between a sleep mode in which the communication module is not operable to communicate and an active mode in which the communication module is operable to communicate, a configurable auxiliary receiver configured to initiate switching of the communication module from the sleep mode to the active mode based on detection of a wake-up signal, and a controller configured to control configuration of the configurable auxiliary receiver to operate using an auxiliary receiver configuration. A controller includes a processor and a memory communicatively connected to the processor wherein the processor is configured to determine a configuration for a configurable auxiliary communication module of an energy-limited wireless node, and propagate, toward the energy-limited wireless node, an indication of the configuration for the configurable auxiliary communication module of the energy-limited wireless node.

20 Claims, 9 Drawing Sheets

(58) Field of Classification Search
CPC ......... H04W 52/0206; H04W 52/0209; H04W 52/0216; H04W 52/0225; H04W 52/0229; H04W 52/0241; H04W 56/001; H04W 68/02; H04W 72/0406; H04W 76/048; H04W 84/045; Y02B 60/34; Y02B 60/50
See application file for complete search history.

(56) References Cited

U.S. PATENT DOCUMENTS

| | | | |
|---|---|---|---|
| 2012/0106423 A1* | 5/2012 | Nylander | H04W 52/0241 370/311 |
| 2013/0058388 A1* | 3/2013 | Muhammad | H04B 15/04 375/222 |
| 2014/0050133 A1* | 2/2014 | Jafarian | H04W 74/085 370/311 |
| 2014/0112226 A1 | 4/2014 | Jafarian et al. | |

\* cited by examiner

CONFIGURABLE COMMUNICATION MODULES FOR FLEXIBLE COMMUNICATIONS WITHIN AN ENERGY-LIMITED WIRELESS SYSTEM

TECHNICAL FIELD

The disclosure relates generally to communication systems and, more specifically but not exclusively, to supporting flexibility of communications in energy-limited wireless systems.

BACKGROUND

In general, the Internet-of-Things (IoT) is a computing concept in which physical objects are connected to Internet infrastructure. The physical objects may be IoT devices that are configured to communicate via the Internet (e.g., sensors, actuators, monitors, controllers, or the like) or may be physical objects that are associated with IoT devices that are configured to communicate via the Internet. In either case, the IoT devices support communications and may support various other functions (e.g., discovering the existence of other IoT devices, providing information, supporting control over objects, negotiating service agreements, and the like), typically with little or no human assistance or supervision. The deployment and use of increasing numbers of IoT devices is expected to lead to a wide variety of applications which may significantly improve quality of life. For example, IoT devices may be used to support communication applications, retail applications, healthcare applications, energy generation and distribution applications, factory automation applications, agricultural applications, mining applications, and smart-city applications, to name just a few. However, realization of such applications is expected to be limited by the fact that most IoT devices are expected to be low-power, low-cost devices that support only short-range wireless communications, thereby preventing the ubiquitous IoT device connectivity that is expected to be required in order to fully realize many such applications.

SUMMARY OF EMBODIMENTS

Various deficiencies in the prior art may be addressed by various embodiments for supporting flexibility of communications in an energy-limited wireless system.

In at least some embodiments, an energy-limited wireless node includes a communication module configured to switch between a sleep mode in which the communication module is not operable to communicate and an active mode in which the communication module is operable to communicate, a configurable auxiliary receiver configured to initiate switching of the communication module from the sleep mode to the active mode based on detection of a wake-up signal, and a controller configured to control configuration of the configurable auxiliary receiver to operate using an auxiliary receiver configuration. In at least some embodiments, a method includes detecting, at an energy-limited wireless node including a communication module configured to switch between a sleep mode in which the communication module is not operable to communicate and an active mode in which the communication module is operable to communicate and a configurable auxiliary receiver configured to initiate switching of the communication module from the sleep mode to the active mode based on detection of a wake-up signal, an indication of a request to configure the configurable auxiliary receiver to operate using an auxiliary receiver configuration, and configuring the configurable auxiliary receiver to operate using the auxiliary receiver configuration.

In at least some embodiments, an apparatus includes a processor and a memory communicatively connected to the processor, wherein the processor is configured to determine a configuration for a configurable auxiliary communication module of an energy-limited wireless node, and propagate, toward the energy-limited wireless node, an indication of the configuration for the configurable auxiliary communication module of the energy-limited wireless node. In at least some embodiments, a method includes determining a configuration for a configurable auxiliary communication module of an energy-limited wireless node, and propagating, toward the energy-limited wireless node, an indication of the configuration for the configurable auxiliary communication module of the energy-limited wireless node.

In at least some embodiments, an energy-limited wireless node includes a communication module configured to switch between a sleep mode in which the communication module is not operable to communicate and an active mode in which the communication module is operable to communicate, a configurable auxiliary receiver configured to control switching of the communication module from the sleep mode to the active mode based on detection of a wake-up signal, and a controller configured to detect receipt of a wake-up signal via the configurable auxiliary receiver and to control propagation of the wake-up signal toward a second energy-limited wireless node. In at least some embodiments, a method for use by an energy-limited wireless node includes receiving a wake-up signal via a configurable auxiliary receiver of the energy-limited wireless node wherein the configurable auxiliary receiver of the energy-limited wireless node is configured to control switching of a communication module of the energy-limited wireless node from a sleep mode in which the communication module is not operable to communicate to an active mode in which the communication module is operable to communicate based on detection of the wake-up signal, and propagating the wake-up signal toward a second energy-limited wireless node.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements common to the figures.

DETAILED DESCRIPTION OF EMBODIMENTS

Figure 1:
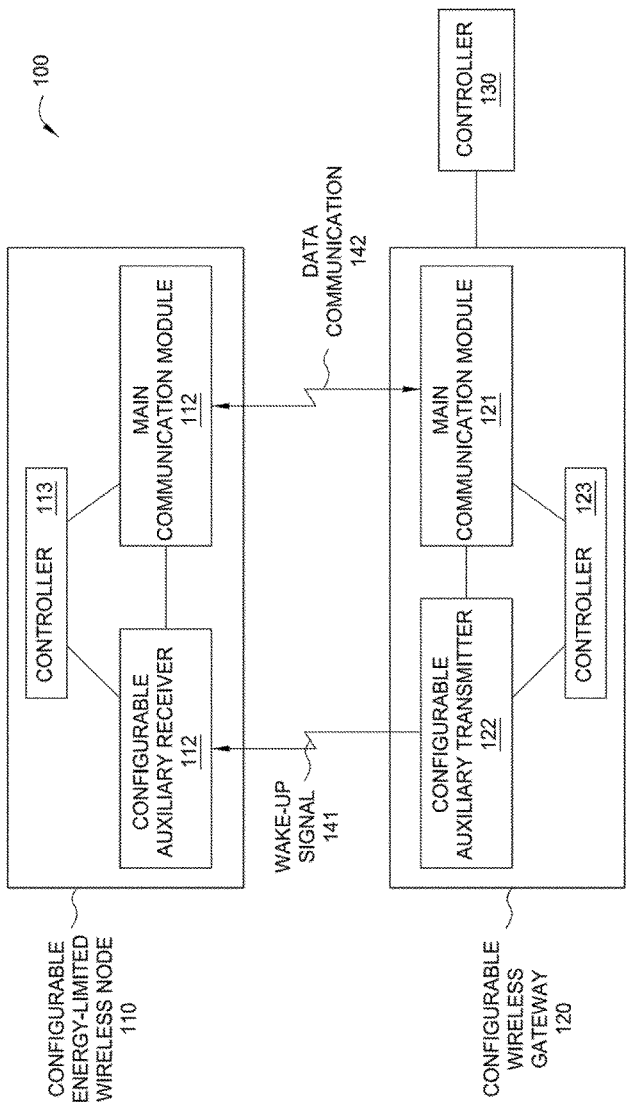
FIG. 1 depicts an exemplary energy-limited wireless system including a configurable wireless gateway, a configurable energy-limited wireless node, and a controller that is configured to control configuration of the configurable wireless gateway and the configurable energy-limited wireless node.

In general, a capability for flexible communications in an energy-limited wireless system is provided. The capability for flexible communications in an energy-limited wireless system may support use of one or more configurable communication modules of one or more communication nodes to improve or optimize one or more aspects of communication between communication nodes of the energy-limited wireless system. In at least some embodiments, for example, in an energy-limited wireless node including a configurable auxiliary receiver and a main communication module (e.g., including only receiver functions, including only transmitter functions, or including both receiver functions and transmitter functions) where the configurable auxiliary receiver is configured to control an operational mode of the main communication module (e.g., where the main communication module is normally in a sleep mode or state in which the main communication module is not operable to communicate, and the configurable auxiliary receiver is configured to receive a wake-up signal and, responsive to the wake-up signal, initiate transition of the main communication module from the sleep mode or state to an active mode or state in which the main communication module is operable to communicate), the energy-limited wireless node may include a controller configured to control configuration of the configurable auxiliary receiver in a manner tending to improve or optimize various aspects related to communication by the energy-limited wireless node (e.g., node-level energy consumption or performance of the energy-limited wireless node, energy consumption or performance of all or part of the energy-limited wireless system, or the like, as well as various combinations thereof). In at least some embodiments, for example, in an energy-limited wireless system including a pair of energy-limited wireless nodes, a configurable transmitter of a first energy-limited wireless node of the pair of energy-limited wireless nodes (e.g., an auxiliary transmitter configured to transmit a wake-up signal, a transmitter or transmit module or function of a main communication module, or the like) and a configurable receiver of a second energy-limited wireless node of the pair of energy-limited wireless nodes (e.g., an auxiliary receiver configured to receive a wake-up signal, a receiver or receive module or function of a main communication module, or the like) may be dynamically configured to improve or optimize one or more aspects related to link-level communication from the first energy-limited to the second energy-limited wireless node (e.g., one or more aspects of communication of a wake-up signal from the configurable transmitter to the configurable receiver, one or more aspects of communication of data from the configurable transmitter to the configurable receiver, or the like, as well as various combinations thereof), to improve or optimize one or more aspects related to communications within the energy-limited wireless system, or the like, as well as various combinations thereof. In at least some embodiments, for example, in an energy-limited wireless system including multiple energy-limited wireless nodes having configurable communication modules, including configurable transmitter modules (e.g., configurable auxiliary transmitters for transmitting wake-up signals, configurable main transmitter functions for transmitting data communications, or the like) and configurable receiver modules (e.g., configurable auxiliary receiver functions for receiving wake-up signals, configurable main receiver functions for receiving data communications, or the like), configurable communication modules of the energy-limited wireless nodes may be configured to improve or optimize various aspects related to communication within the energy-limited wireless system. The configuration of configurable communication modules or functions in an energy-limited wireless system may change dynamically based on various considerations (e.g., energy use of the configurable communication modules or functions, performance of the configurable communication modules or functions, link-level energy or performance requirements or energy or performance goals, network-level energy or performance requirements or energy or performance goals, or the like, as well as various combinations thereof). The availability of configurable communication functions in energy-limited wireless nodes of a group of energy-limited wireless nodes (e.g., all energy-limited wireless nodes of a network, a subset of energy-limited wireless nodes of a network, or the like) may be used to support various functions or capabilities (e.g., improvement or optimization of communication between wireless gateways and energy-limited wireless nodes, improvement or optimization of pairwise communication between energy-limited wireless nodes, improvement or optimization of energy use across the network or portions of the network, tradeoffs of time and energy resources to provide range extension and energy optimization, or the like, as well as various combinations thereof). The availability of configurable communication functions in an energy-limited wireless system may be used to support various other functions or capabilities as discussed further below. These and various other embodiments and advantages associated with use of configurable communication modules in an energy-limited wireless system may be further understood by first considering an exemplary communication system that is configured to support configuration of a configurable auxiliary transmitter of a wireless gateway and configuration of a configurable auxiliary receiver of an energy-limited wireless node, as depicted in FIG. 1.

FIG. 1 depicts an exemplary energy-limited wireless system including a configurable wireless gateway, a configurable energy-limited wireless node, and a controller that is configured to control configuration of the configurable wireless gateway and the configurable energy-limited wireless node.

As depicted in FIG. 1, energy-limited wireless system 100 includes a configurable energy-limited wireless node (CEWN) 110, a configurable wireless gateway (CWG) 120, and a controller 130 that is configured to control configuration of the CWG 120 and the CEWN 110. The CEWN 110 may be a smart device, an Internet-of-Things (IoT) device, or any other suitable device which may be configured as depicted and described herein. The CWG 120 may be a CEWN (e.g., similar to CEWN 110), a wireless access node (e.g., a NodeB, an eNodeB, a wireless relay node with a permanent power source that is configured to facilitate communication between CEWNs and cellular access nodes, or the like), or any other suitable element which may be configured as depicted and described herein. The controller 130 may be a CEWN (e.g., similar to CEWN 110), a wireless access node (e.g., a NodeB, an eNodeB, a wireless relay node with a permanent power source that is configured to facilitate communication between CEWNs and cellular access nodes, or the like), a server in a core wireless network, or any other suitable element which may be configured as depicted and described herein. It will be appreciated that, in at least some embodiments, CWG 120 and controller 130 may be integrated into the same device.

The CEWN 110 and the CWG 120 cooperate to support energy efficient communication of data between CEWN 110 and CWG 120. The CEWN 110 includes a main communication module 111, a configurable auxiliary receiver (CAR) 112, and a controller 113. The CWG 120 includes a main communication module 121, a configurable auxiliary transmitter (CAT) 122, and a controller 123. As depicted in FIG. 1, the CAT 122 is configured to transmit a wake-up signal 141 to CAR 112 to enable data communication 142 between main communication module 111 and main communication module 121 (which may include upstream transmission of data from main communication module 111 to main communication module 121, downstream transmission of data from main communication module 121 to main communication module 111, or a combination thereof). It will be appreciated that, although primarily presented with respect to an embodiment in which CEWN 110 includes the main communication module 111 and the CAR 112 (and these elements are implemented as separate modules), in at least some embodiments CEWN 110 may provide such elements in other configurations (e.g., using a single module to support functions of main communication module 111 and the CAR 112), may support fewer or more elements or functions (e.g., inclusion of a CAT, inclusion of a configurable auxiliary transceiver, exclusion of a main transmitter function or exclusion of a main receiver function, or the like), or the like, as well as various combinations thereof. Similarly, it will be appreciated that, although primarily presented with respect to an embodiment in which CWG 120 includes the main communication module 121 and the CAT 122 (and these elements are implemented as separate modules), in at least some embodiments CWG 120 may provide such elements in other configurations (e.g., using a single module to support functions of main communication module 121 and the CAT 122), may support fewer or more elements or functions (e.g., inclusion of a CAR, inclusion of a configurable auxiliary transceiver, exclusion of a main transmitter function or exclusion of a main receiver function, or the like), or the like, as well as various combinations thereof.

The CEWN 110 may support various capabilities for providing flexible communications in energy-limited wireless system 100.

The main communication module 111 is configured to support data communications 142 for the CEWN 110. The main communication module 111 may be a transmitter, a receiver, or a transceiver (depending on whether data communication 142 is upstream and/or downstream). The main communication module 111 is configured to support at least two operational modes, including a sleep mode in which the main communication module 111 is not operable to communicate and an active mode in which the main communication module 111 is operable to communicate. The sleep mode may be an energy-limited mode or an off mode (both modes may be supported) that generally enables conservation of energy for the CEWN 110. The active mode enables the main communication module 111 to communicate wirelessly via the CWG 120 (e.g., receive traffic from CWG 120, transmit traffic to CWG 120, or a combination thereof). In general, given that CEWN 110 is an energy-limited wireless node (e.g., a node having a limited energy supply, such as a battery), it is preferable to maintain the main communication module 111 in the sleep mode except during times when the CEWN 110 will communicate using main communication module 111.

The CAR 112 is configured to control switching of the main communication module 111 from the sleep mode to the active mode based on detection of wake-up signal 141 (and, thus, also may be referred to herein as a configurable wake-up radio). The wake-up signal 141 may be any suitable type of wireless signal which may be detected by CAR 112. The wake-up signal 141 may originate from the CWG 120 or an element upstream of the CWG 120 may trigger the CWG 120 to transmit the wake-up signal 141. The CAR 112 may provide ultra low-power receive and control functions for controlling the operational mode of the main communication module 111. The CAR 112 is expected to consume significantly less resources of CEWN 110 than the main communication module 111, thereby conserving resources of CEWN 110 as the main communication module 111 is able to remain in the sleep mode as long as needed and then rapidly transition from the sleep mode to the active mode for data communication as needed or desired. The CAR 112 may be operated in an always-on state (e.g., such that CAR 112 may detect a wake-up signal at any time for reduced latency of communication), duty-cycled (e.g., to further reduce the energy usage of CAR 112 and, thus, of CEWN 110), or the like.

The CAR 112 is configurable and may be configured in various ways. The configuration of CAR 112 may include configuration of a receive power of the CAR 112 (which, it will be understood, provides a tradeoff between the range of the CAR 112 and the power consumption of the CAR 112). The configuration of CAR 112 may include configuration of one or more components of which CAR 112 is composed (e.g., a low noise amplifier (LNA), a phase-locked loop (PLL), a switch block, a detector, a decoder, or the like, as well as various combinations thereof). The configuration of CAR 112 may include selection of a particular component or set of components of CAR 112 that are to be used by CAR 112. The configuration of CAR 112 may include selection of a particular circuit or set of circuits of CAR 112 or one or more components of CAR 112. The configuration of CAR 112 may include selection of a particular algorithm or set of algorithms of CAR 112 or one or more components of CAR 112. The configuration of CAR 112 may include selection of a particular parameter or set of parameters of CAR 112 or one or more components of CAR 112. The configuration of CAR 112 may include selection of a particular parameter value or set of parameter values of CAR 112 or one or more components of CAR 112. The configuration of CAR 112 may include, for one or more components or stages of components of CAR 112, configuration of the one or more components or one or more stages of components (e.g., in terms of one or more of which circuit(s) to use, which algorithm(s) to use, which parameter(s) or parameter setting(s) to use, or the like, as well as various combinations thereof) of CAR 112. The configuration of CAR 112 may include selection of various other components, circuits, algorithms, parameters, parameter values, or the like, as well as various combinations thereof.

The CAR 112 may be configured based on various objectives. The CAR 112 may be configured based on objectives related to CEWN 110. The objectives related to CEWN 110 may include one or more of satisfying a power consumption goal for CAR 112 (e.g., improving a lifetime of the CEWN 110 by minimizing energy consumption of CAR 112, minimizing average power consumption of CAR 112, or the like, as well as various combinations thereof), satisfying a range goal for CAR 112 (and, thus, for CEWN 110), satisfying a throughput goal for CAR 112, satisfying a latency goal CAR 112, or the like, as well as various combinations thereof. The CAR 112 may be configured in a manner for tuning and optimizing various objectives for components of which the CAR 112 is composed. The CAR 112 may be configured based on various objectives related to a network (or network portion) within which CEWN 110 is operating (discussed further below). It will be appreciated that the flexibility of CAR 112 may create various energy and spectral efficiencies at the node level. It will be appreciated that the flexibility of CAR 112, when applied at many nodes of a network (e.g., where nodes of the network use auxiliary receivers similar to CAR 112), may support different network architectures (e.g., single-hop or multi-hop data delivery) that may influence network performance, optimize or at least improve one or more energy consumption metrics at the network level (e.g., maximizing network lifetime by maximizing time to first node failure, minimizing total energy consumption across all nodes of the network, or the like), optimize or at least improve network throughput, optimize or at least improve network latency, or the like, as well as various combinations thereof.

The CAR 112 of CEWN 110 supports dynamic control over various tradeoffs related to design and use of auxiliary receivers, as the low power consumption limits of auxiliary receivers generally tend to limit either the range or throughput of the auxiliary receivers. For example, the sensitivity of auxiliary receivers is generally poor due to the absence of certain elements (e.g., multi-stage amplifiers, phase-locked loops (PLLs), down-converters, multi-stage filters, and so forth), which generally are omitted as the inclusion of such elements would increase the cost and power consumption of the auxiliary receivers, and thus, auxiliary receivers are generally limited to operate at very low throughputs in order to detect signals using such poor sensitivity. Similarly, for example, while signal coding techniques (e.g., repetition code) may lead to improved receive sensitivity and, thus, improved range of auxiliary receivers, such signal coding techniques may reduce the throughput (e.g., due to repeated data) and, thus, impact application performance. The CAR 112 of CEWN 110, by supporting dynamic control over tradeoffs between sensitivity (and, thus, range) and power consumption of auxiliary receivers and tradeoffs between sensitivity and throughput of auxiliary receivers, may overcome (or at least lessen the impact of) many of above-described limitations of existing auxiliary receivers.

The controller 113 is configured to control configuration of CAR 112 of CEWN 110.

The controller 113 may control configuration of the CAR 112 by modifying the configuration of CAR 112. The controller 113 may control configuration of the CAR 112 by causing CAR 112 to be configured based on a configuration profile from a set of configuration profiles. The controller 113 may control configuration of the CAR 112 by causing CAR 112 to switch from a first (or current) configuration profile to a second (or new) configuration profile. The configuration profiles according to which CAR 112 may be configured may be maintained by controller 113 (e.g., pre-installed on controller 113 during manufacturing of CEWN 110 or during initialization of CEWN 110, downloaded into controller 113 by controller 130 (e.g., during initialization of CEWN 110, in response to a condition, periodically, or the like), or the like, as well as various combinations thereof), maintained on controller 130, or the like, as well as various combinations thereof. For example, configuration profiles for CAR 112 may be maintained by controller 113 such that controller 113 may apply configuration profiles for configuring the CAR 112 (e.g., responsive to detection of conditions locally by controller 113, responsive to instructions from controller 130, or the like). For example, configuration profiles for CAR 112 may be maintained by controller 130 and communicated from controller 130 to controller 113 (e.g., responsive to detection of conditions locally by controller 130 or the like) such that controller 113 may apply configuration profiles for configuring the CAR 112. It will be appreciated that configuration profiles may specify various aspects associated with configuration of the CAR 112 as discussed above (e.g., parameters to be used, circuits to be used, algorithms to be used, configurable elements to be used, or the like, as well as various combinations thereof).

The controller 113 may control configuration of CAR 112 based on a trigger condition. The trigger condition may be detection of a temporal condition (e.g., expiration of a timer, detection of a particular time of day or day of the week, or the like), detection of an event (e.g., expiration of a timer, detection of a particular time of day or day of the week, a sensed event, a topology change, receipt of a message, or the like), or the like, as well as various combinations thereof. The trigger condition may be detected by controller 113 of CEWN 110, detected by controller 130 such that controller 130 sends to CEWN 110 a message configured to trigger controller 113 to configure CAR 112, or the like, as well as various combinations thereof. The trigger condition may be detected by controller 113, thereby causing controller 113 to reconfigure the CAR 112 (e.g., to reconfigure the CAR 112 based on the trigger condition, to select a configuration to be used by CAR 112 and to reconfigure CAR 112 to use the configuration selected to be used by CAR 112, or the like). The trigger condition may be detected by controller 130, thereby causing controller 130 to send a message adapted to cause the controller 113 to reconfigure the CAR 112 (e.g., a message including an indication of the trigger condition, a message including identification of a configuration to be used by CAR 112, or the like, as well as various combinations thereof). In other words, the controller 113 may control configuration of CAR 112 based on one or more of local control functions of controller 113, commands or information received from controller 130, or the like, as well as various combinations thereof.

The CWG 120 may support various capabilities for providing flexible communications in energy-limited wireless system 100.

The main communication module 121 is configured to support data communications 142 for the CWG 120. The main communication module 121 may be a transmitter, a receiver, or a transceiver (e.g., depending on whether data communication 142 is upstream and/or downstream).

The CAT 122 is configured to control transmission of wake-up signal 141 to CAR 112 of CEWN 110, for causing the CAR 112 of CEWN 110 to control transitioning of the main communication module 111 of CEWN 110 from a sleep mode to an active mode, as discussed above. The wake-up signal 141 may be any suitable type of wireless signal which may be detected by CAR 112. The wake-up signal 141 may originate from the CWG 120 or an element upstream of the CWG 120 may trigger the CWG 120 to transmit the wake-up signal 141.

The CAT 122 is configurable and may be configured in various ways. The configuration of CAT 122 may include configuration of a transmit power of the CAT 122 (which, it will be understood, provides a tradeoff between the range of the CAR 112 of CEWN 110 and the power consumption of the CAR 112 of CEWN 110). The configuration of CAT 122 may include configuration of the wake-up signal 141 that is to be transmitted by CAT 122. The configuration of CAT 122 may include configuration of the encoding (e.g., level of repetition or one or more other encoding parameters). The configuration of CAT 122 may include configuration of one or more components of which CAT 122 is composed. The configuration of CAT 122 may include selection of a particular circuit or set of circuits of CAT 122 that are to be used by CAT 122. The configuration of CAT 122 may include selection of a particular algorithm or set of algorithms of CAT 122 that are to be used by CAT 122. The configuration of CAT 122 may include, for one or more elements or stages of elements of CAT 122, configuration of the one or more elements or one or more stages (e.g., in terms of one or more of which circuit(s) to use, which algorithm(s) to use, which parameter(s) or parameter setting(s) to use, or the like, as well as various combinations thereof) of CAT 122. The configuration of CAT 122 may include selection of various other parameters, circuits, algorithms, or the like.

The CAT 122 may be configured based on various objectives. The CAT 122 may be configured based on objectives related to CEWN 110 or CWG 120. The objectives related to CEWN 110 may include one or more of satisfying a power consumption goal for CAR 112 (e.g., improving a lifetime of the CEWN 110 by minimizing energy consumption of CAR 112, minimizing average power consumption of CAR 112, or the like, as well as various combinations thereof), satisfying a range goal for CAR 112 (and, thus, for CEWN 110), satisfying a throughput goal for CAR 112, satisfying a latency goal CAR 112, or the like, as well as various combinations thereof. The CAT 122 may be configured in a manner for tuning and optimizing various objectives for components of which the CAT 122 is composed. The CAT 122 may be configured based on various objectives related to a network (or network portion) served by CWG 120 (discussed further below). It will be appreciated that the flexibility of CAT 122 may create various energy and spectral efficiencies for CEWN 110. It will be appreciated that the flexibility of CAT 122, in combination with the flexibility of CAR 112 as discussed above), may support different network architectures (e.g., single-hop or multi-hop data delivery) that may influence network performance, optimize or at least improve one or more energy consumption metrics at the network level (e.g., maximizing network lifetime by maximizing time to first node failure, minimizing total energy consumption across all nodes of the network, or the like), optimize or at least improve network throughput, optimize or at least improve network latency, or the like, as well as various combinations thereof.

The CAT 122 of CWG 120 supports dynamic control over various tradeoffs related to design and use of auxiliary receivers, as the low power consumption limits of auxiliary receivers generally tend to limit either the range or throughput of the auxiliary receivers. For example, while signal coding techniques (e.g., repetition code) may lead to improved receive sensitivity and, thus, improved range of auxiliary receivers, such signal coding techniques may reduce the throughput (e.g., due to repeated data) and, thus, impact application performance. Similarly, for example, coding rate and link quality changes affect latency (e.g., the symbol rate remains the same, but with a high redundancy coding rate more symbols are required to transmit the message and, thus, more time is required to transmit the message). The CAT 122 of CWG 120, by supporting dynamic control over tradeoffs between sensitivity (and, thus, range) and power consumption of auxiliary receivers and tradeoffs between sensitivity and throughput of auxiliary receivers, may enable many of above-described limitations of existing auxiliary receivers to be overcome (or may at least lessen the impact of many of above-described limitations of existing auxiliary receivers).

The controller 123 is configured to control configuration of CAT 122 of CWG 120.

The controller 123 may control configuration of the CAT 122 by modifying the configuration of CAT 122. The controller 123 may control configuration of the CAT 122 by causing CAT 122 to be configured based on a configuration profile from a set of configuration profiles. The controller 123 may control configuration of the CAT 122 by causing CAT 122 to switch from a first (or current) configuration profile to a second (or new) configuration profile. The configuration profiles according to which CAT 122 may be configured may be maintained by controller 123 (e.g., pre-installed on controller 123 during manufacturing of CWG 120 or during initialization of CWG 120, downloaded into controller 123 by controller 130 (e.g., during initialization of CWG 120, in response to a condition, periodically, or the like), or the like, as well as various combinations thereof), maintained on controller 130, or the like, as well as various combinations thereof. For example, configuration profiles for CAT 122 may be maintained by controller 123 such that controller 123 may apply configuration profiles for configuring the CAT 122 (e.g., responsive to detection of conditions locally by controller 123, responsive to instructions from controller 130, or the like). For example, configuration profiles for CAT 122 may be maintained by controller 130 and communicated from controller 130 to controller 123 (e.g., responsive to detection of conditions locally by controller 130 or the like) such that controller 123 may apply configuration profiles for configuring the CAT 122. It will be appreciated that configuration profiles may specify various aspects associated with configuration of the CAT 122 as discussed above (e.g., parameters to be used, circuits to be used, algorithms to be used, configurable elements to be used, or the like, as well as various combinations thereof).

The controller 123 may control configuration of CAT 122 based on a trigger condition. The trigger condition may be a temporal condition (e.g., expiration of a timer, detection of a particular time of day or day of the week, or the like), detection of an event (e.g., a sensed event, a topology change, receipt of a message, or the like), or the like, as well as various combinations thereof. The trigger condition may be detected by controller 123 of CWG 120, detected by controller 130 such that controller 130 sends to CWG 120 a message configured to trigger controller 123 to configure CAT 122, or the like, as well as various combinations thereof. The trigger condition may be detected by controller 123, thereby causing controller 123 to reconfigure the CAT 122 (e.g., to reconfigure the CAT 122 based on the trigger condition, to select a configuration to be used by CAT 122 and to reconfigure CAT 122 to use the configuration selected to be used by CAT 122, or the like). The trigger condition may be detected by controller 130, thereby causing controller 130 to send a message adapted to cause the controller 123 to reconfigure the CAT 122 (e.g., a message including an indication of the trigger condition, a message including identification of a configuration to be used by CAT 122, or the like, as well as various combinations thereof). In other words, the controller 123 may control configuration of CAT 122 based on one or more of local control functions of controller 123, commands or information received from controller 130, or the like, as well as various combinations thereof.

The controller 130, as discussed above, is configured to control configuration of CAR 112 of CEWN 110 and to control configuration of CAT 122 of CWG 120. The controller 130, as discussed above, may be configured to control configuration of CAR 112 and CAT 122 independently of each other; however, controller 130 also may be configured to control configuration of CAR 112 and CAT 122 in combination with each other, thereby enabling various improvements or optimizations associated with communication of wake-up signal 141 from CAT 122 to CEWN 110. In other words, it will be appreciated that, although primarily depicted and described with respect to use of a configurable auxiliary communication module of a node to improve or optimize performance of the node (illustratively, CAR 112 or CAT 122), configurable auxiliary transmit and receive modules of a pair of nodes may be used to improve or optimize various aspects of link-level communication between the pair of nodes. The configuration of CAR 112 and CAT 122 in combination with each other in order to improve or optimize communication between the CAT 122 and the CAR 112 may be further understood by considering the exemplary CAT/receiver pair of FIG. 2.

Figure 2:
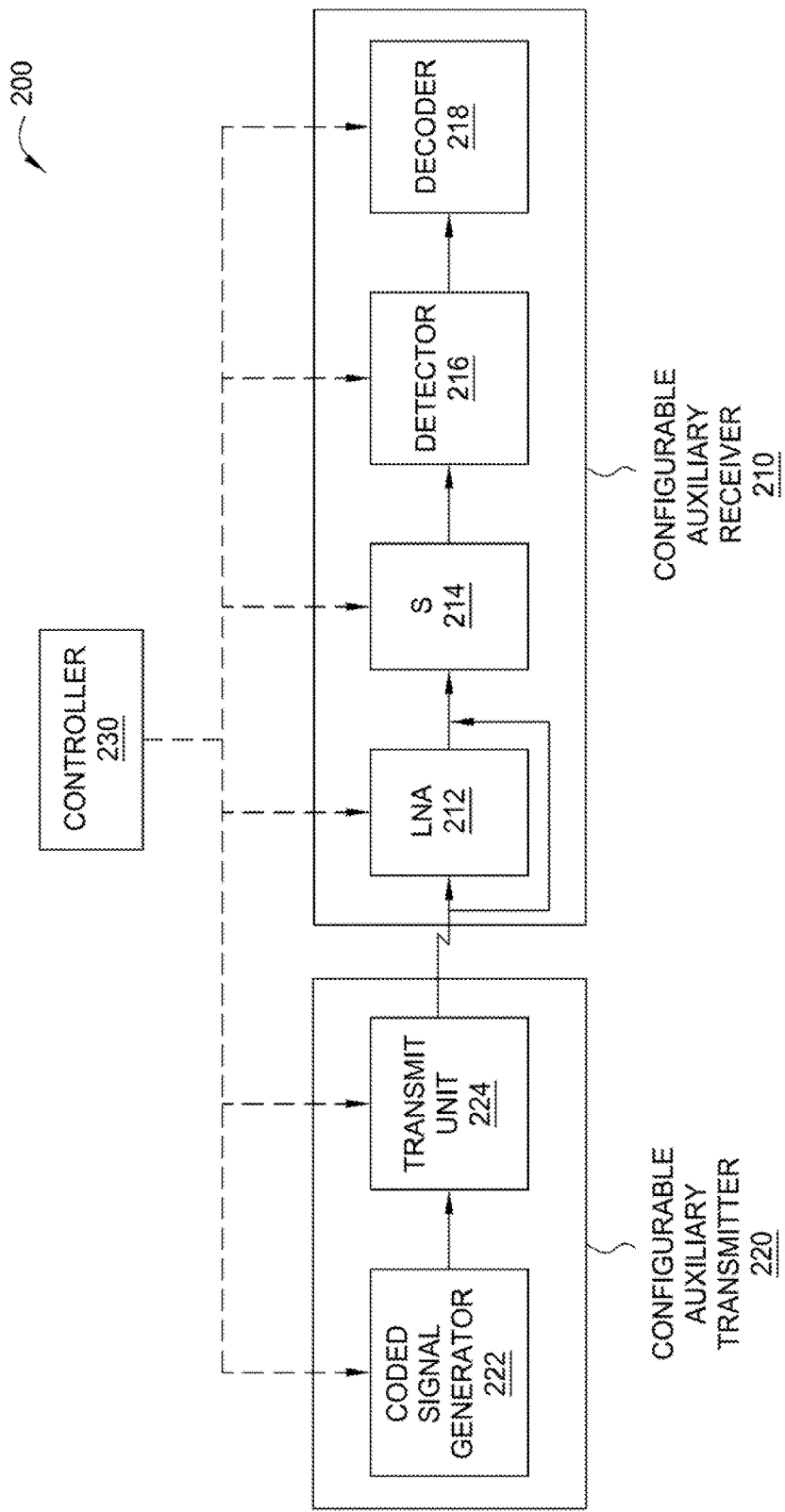
FIG. 2 depicts an exemplary energy-limited wireless system including a controller configured to control configuration of a configurable auxiliary receiver and a configurable auxiliary transmitter.

FIG. 2 depicts an exemplary energy-limited wireless system including a controller configured to control configuration of a configurable auxiliary receiver and a configurable auxiliary transmitter.

The energy-limited wireless system 200 includes a CAR 210, a CAT 220, and a controller 230. The CAR 210 and CAT 220 may correspond to CAR 112 and CAT 122 of FIG. 1. Similarly, controller 230 may correspond to controller 130 of FIG. 1.

The CAR 210 and the CAT 220 each include various configurable elements which may be configured under the control of controller 230 (where configuration is indicated by the dotted lines from the controller 230 to each of the configurable elements). The CAT 220 includes a coded signal generator 222 and a transmit unit 224. The coded signal generator 222 receives the original signal to be transmitted and encodes the original signal to be transmitted for transmission over the air, thereby forming an encoded signal. The transmit unit 224 receives the encoded signal from the coded signal generator 222, prepares the encoded signal to be radiated, and radiates the encoded signal for wireless transmission to CAR 210. The CAR 210 includes an LNA 212, a switch (S) block 214, a detector 216, and a decoder 218. The LNA 212 amplifies the received signal and noise, the detector 216 estimates the encoded signal, and the decoder 218 estimates the original signal sent by the CAT 220. The S block 214 is configured to dynamically insert the LNA 212 into the receiver chain or remove the LNA 212 from the receiver chain. It is noted that, although omitted for purposes of clarity, another S block may be used to select the detector (illustratively, detector 216) that is feeding decoder 218.

The controller 230 is configured to control configuration of CAR 210 and the CAT 220.

The controller 230 may be configured to control configuration of CAR 210 and CAT 220 based on tradeoffs between at least some of energy usage, delay, bandwidth, rate, throughput, range, or the like, as well as various combinations thereof.

The controller 230 may be configured to control configuration of CAR 210 and CAT 220 by obtaining configuration input information, determining configurations of the configurable elements of CAR 210 and CAT 220 based on the configuration input information, and propagating, toward the CAR 210 and the CAT 220, configuration control information for controlling configuration of the configurable elements of CAR 210 and CAT 220 based on the determined configurations of the configurable elements of CAR 210 and CAT 220.

The configuration input information may include information indicative of some or all of the programmable tradeoffs related to configuration of the configurable elements of CAR 210 and CAT 220, which may include node-level tradeoffs (e.g., tradeoffs specific to CAR 210, tradeoffs specific to CAT 220, or the like), node-pair-level tradeoffs (e.g., tradeoffs specific to communication between CAT 220 and CAR 210, network-level tradeoffs (e.g., related to operation of CAT 220 and CAR 210 in a network including other energy-limited wireless nodes), or the like, as well as various combinations thereof. The configuration input information may include information related to high-level communication features, information related to circuit level implementation features, or the like, as well as various combinations thereof. The configuration input information may include information indicative of the functional performance tradeoffs between the configurable elements of CAR 210 and CAT 220, power consumption tradeoffs between configurable elements of CAR 210 and CAT 220, channel gain information, or the like, as well as various combinations thereof.

The configuration control information may include any information for configuring configurable elements of CAR 210 and CAT 220, which may vary for different types of configurable elements of CAR 210 and CAT 220. For example, configuration control information may specify configurable elements to be used, circuits to be used (e.g., which configurable elements are used, which circuits are used to provide the functions of configurable elements, or the like), algorithms to be used, parameters or parameter values to be used, or the like, as well as various combinations thereof. For example, configuration control information for CAT 220 may include a type of signal encoding to be used by coded signal generator 222, a transmit power to be used by transmit unit 224, or the like, as well as various combinations thereof. For example, configuration control information for CAR 210 may include a level of power of LNA 212, a detection and decoding algorithm to be used by detector 216 and decoder 218, or the like, as well as various combinations thereof.

The controller 230, as noted above, may be configured to control configuration of CAR 210 and CAT 220 based on various tradeoffs. The manner in which controller 230 may control configuration of CAR 210 and CAT 220 based on such tradeoffs may be further understood by considering examples of some such tradeoffs.

In at least some embodiments, for example, controller 230 may control configuration of CAR 210 and CAT 220 in a manner for balancing transmit power of transmit unit 224 and LNA power of LNA 212. For example, use of a higher transmit power by transmit unit 224 requires lower receiver sensitivity (e.g. lower LNA power by LNA 212) for the same receive SNR. Alternatively, for example, use of a particular code generation algorithm by coded signal generator 222 and use of a particular decoder circuit for decoder 218 may provide a similar tradeoff between transmit power of transmit unit 224 and LNA power of LNA 212.

In at least some embodiments, for example, controller 230 may control configuration of CAR 210 and CAT 220 in a manner for balancing LNA power of LNA 212 and the range of the CAR 210 from the CAT 220. For example, for a given symbol rate, a given signal encoding rate of coded signal generator 222, and a given transmit power of transmit unit 224, the maximum range of the CAR 210 (e.g., range within which a given configuration of CAR 210 can successfully decode the signal) may be determined by configuration of LNA 212 that affects receive power level. Conversely, the configuration of LNA 212 also determines the link capacity. Also, link quality determines the communication to be done and the time during which CAT 220 and CAR 210 must be operating, both of which affect circuit energy consumption.

It will be appreciated that, although primarily depicted and described with respect to configuration of the CAR 210 and the CAT 220 based on specific tradeoffs, CAR 210 and CAT 220 may be configured based on various other tradeoffs. For example, given a wireless link with high channel gain, a signal with high receive power is received with low redundancy code rate. For example, given a wireless link with low channel gain and low redundancy code rate, signal detection (receiver sensitivity) can be improved by using higher transmit power at the expense of node energy. Again, it will be appreciated that these are merely a few of the ways in which tradeoffs may be analyzed and evaluated for determining configurations for CAR 210 and CAT 220.

It will be appreciated that, although primarily depicted and described with respect to configuration of the CAR 210 and the CAT 220 where the CAT 220 also is an energy-limited device (in which case the energy costs of transmitting at maximum power generally should not be ignored), CAT 220 may be part of a device having a main power supply (e.g., part of a gateway, such as a NodeB, eNodeB, or the like) in which case it may be possible to ignore the energy cost of transmitting at maximum power (subject to interference considerations).

The controller 230, as noted above, may be configured to control configuration of CAR 210 and CAT 220 responsive to various trigger conditions. The controller 230 may be configured to initiate transition of the configuration of CAR 210 and CAT 220 (or perhaps one or the other of CAR 210 and CAT 220) responsive to trigger conditions. As previously described, the configurations of CAR 210 and CAT 220 may be predetermined and applied by controller 230, determined dynamically and applied by controller 230, or the like, as well as various combinations thereof. The configurations of CAR 210 and CAT 220 may be configuration profiles (e.g., supporting four possible configurations and the optimum configuration is selected responsive to the trigger condition, supporting twelve possible configurations and the optimum configuration is selected responsive to the trigger condition, or the like), may be generated according to the conditions at the time that the configurations are to be applied (e.g., optimized based on the configuration input information without relying on static configuration profiles), or the like, as well as various combinations thereof. In at least some embodiments, CAR 210 and CAT 220 may operate in a default configuration (e.g., corresponding to a relatively low power, low sensitivity state), may transition to a different configuration (e.g., a higher power, higher sensitivity state) responsive to a trigger condition, and may transition from the different configuration back to the default configuration when the trigger condition has passed or cleared. In at least some embodiments, for example, the trigger condition may be a special code, a timer (e.g., expiration of a timer, a preset time (e.g., related to a common broadcast signal), or the like), a message (e.g., a message received over an auxiliary air interface, a message received over a main air interface, or the like), an event (e.g., a sensor event), a network topology change (e.g., addition of nodes, removal of nodes, or the like), or the like, as well as various combinations thereof. The controller 230 may configure the trigger conditions (e.g., one or more of the trigger conditions themselves may be dynamically modified by controller 230).

The controller 230, as noted above, may be configured to control configuration of CAR 210 and CAT 220 responsive to a trigger condition in the form of a special code or codes. The use of a high redundancy rate (e.g., multiple code bits for every information bit) by coded signal generator 222 may overcome one or both of large path loss and poor receiver sensitivity to trigger a transition of the configuration of CAR 210 from a low sensitivity configuration to a high sensitivity configuration (i.e., from low receive power to high receive power). The application of a matching configuration change at the CAT 220 would allow switching from low throughput (high redundancy code rate) to high throughput (low redundancy coding rate) communication. It is noted that such coding rate and link quality changes affect latency (e.g., the symbol rate remains the same, but with a high redundancy coding rate more symbols are required to transmit the message and, thus, more time is required to transmit the message). It is further noted that low link quality (low SNR) affects achievable data rate and latency. The controller 230 may be configured to consider and evaluate such tradeoffs, as well as input information from or about CAR 210 and CAT 220 that is related to such tradeoffs, in order to reach an optimization approximation for configurations of CAR 210 and CAT 220.

It will be appreciated that, although primarily depicted and described with respect to embodiments in which the controller is configured to control configuration of an auxiliary transmitter/receiver pair, as discussed further below the controller may be configured to control configuration of any suitable transmitter/receiver pair (e.g., a main communications transmitter/receiver pair such as for communication between main communication module 111 and main communication module 121 of FIG. 1, a transmitter/receiver pair in which the transmitter supports transmission of both wake-up signals and data communications and the receiver is a CAR (e.g., such as where CWG 120 of FIG. 1 includes only a main communication module 121 that supports both transmission of wake-up signal 141 and data communications 142 and the receiver is the CAR 112 of CEWN 110), or the like, as well as various combinations thereof. It will be appreciated that configuration of other types of transmitter/receiver pairs are contemplated.

It will be appreciated that, although primarily depicted and described with respect to use of a configurable auxiliary communication module of a node to improve or optimize performance of the node (e.g., as presented with respect to FIG. 1) or use of configurable auxiliary transmit and receive modules of a pair of nodes to improve or optimize various aspects of link-level communication between the pair of nodes (e.g., as presented with respect to FIG. 2), configurable auxiliary communication modules of nodes of a network may be used to flexibly configure the network in a manner for improving or optimizing various aspects of communication within the network (e.g., at an individual node level, for link-level communication between pairs of nodes, at the network level, or the like, as well as various combinations thereof). An exemplary wireless network including a single wireless gateway node serving multiple CEWNs is depicted in FIG. 3.

Figure 3:
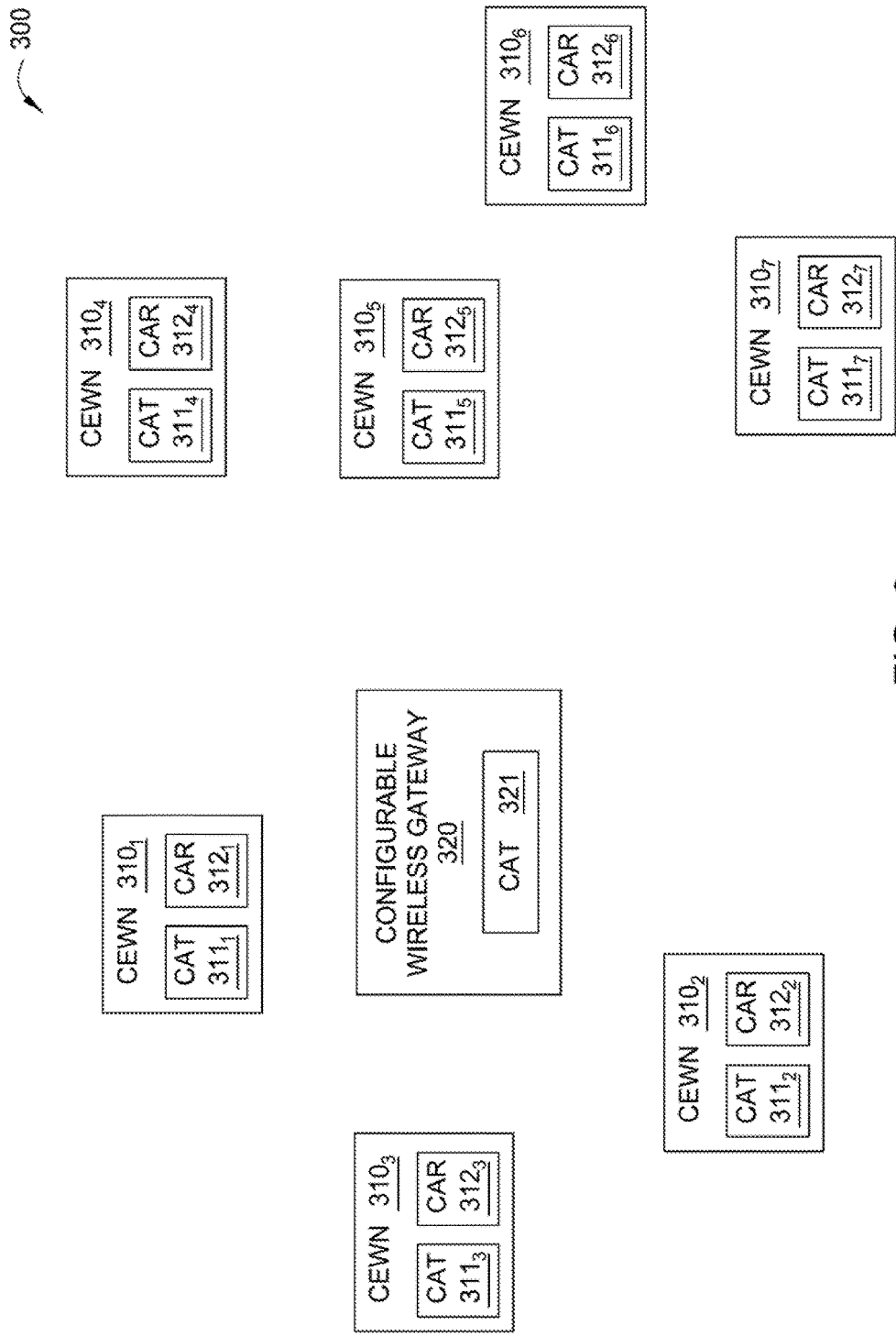
FIG. 3 depicts an exemplary wireless system including a single configurable wireless gateway and multiple configurable energy-limited wireless nodes.

FIG. 3 depicts an exemplary wireless system including a single configurable wireless gateway and multiple configurable energy-limited wireless nodes.

As depicted in FIG. 3, wireless system 300 includes a set of CEWNs $310_1$-$310_7$ (collectively, CEWNs 310 which are illustratively denoted as CEWNs 310) and a CWG 320. The CEWNs 310 are similar to CEWN 110 of FIG. 1. The CEWNs 310 include CARs $312_1$-$312_{12}$ (collectively, CARs 312 which are illustratively denoted as CARs 312). The CEWNs 310 (or a subset thereof) also may include CATs (omitted for purposes of clarity). The CEWNs 310 are arranged at various distances from CWG 320. The CWG 320 may be similar to a combination of wireless gateway 120 and controller 130 of FIG. 1 (although it will be appreciated that such functions may be distributed as depicted and described with respect to FIG. 1). The CWG 320 includes a CAT 321. The CWG 320 is configured to transmit wake-up signals to the CEWNs 310.

In at least some embodiments, CWG 320 is configured to control configuration of CWG 320 and CEWNs 310 for single-hop communications between CWG 320 and CEWNs 310 (namely, each of the CEWNs 310 communicates with CWG 320 directly, rather than indirectly via other CEWNs 310). As discussed above, configuration of CAR(s) 312 of the CEWN(s) 310 and CAT 321 of the CWG 320 may be based on various information, tradeoffs, or the like. As depicted in FIG. 3, the CEWNs 310 are located at different distances from CWG 320, such that the CEWNs 310 have different channel gains associated therewith (e.g., due to environment, radio propagation, or the like). The CARs 312 of the CEWNs 310 may use receiver sensitivities that are at least partly based on distance from CWG 320 (e.g., in order for the CAR 312 of a CEWN 310 to receive a wake-up signal from the CWG 320, receiver sensitivity of the CAR 312 of the CEWN 310 needs to increase with increases in distance from the CWG 320). The amount of energy consumed by a CAR 312 (and, thus, the energy that is consumed by that CEWN 310) increases with increases in receiver sensitivity and decreases with decreases in receiver sensitivity. The CWG 320 may be configured to determine the channel gain or channel condition of a CEWN 310 (or information indicative of the channel gain or channel condition of the CEWN 310) and to control configuration of the CAR 312 of the CEWN 310 based on the channel gain or channel condition (or information indicative of the channel gain or channel condition). The channel gain or channel condition of CEWN 310 may be based on distance, radio propagation, environment, or the like, as well as various combinations thereof. This enables the receiver sensitivities of the CARs 312 of the CEWNs 310 to be tuned (or optimized) to the channel gains or channel conditions of the CEWNs 310. For example, where a first CEWN 310 is located closer to CWG 320 than a second CEWN 310, the configuration of the CAR 312 of the first CEWN 310 may use fewer LNAs (to amplify wake-up signals transmitted by CWG 320) than the configuration of the CAR 312 of the second CEWN 310, thereby enabling the first CEWN 310 to use less energy than the second CEWN 310. The use of CARs 312 obviates the need for use of fixed auxiliary receivers that are designed based on energy-limited wireless nodes located at the edge of the region served by the CWG 320 (which, although suitable for energy-limited wireless nodes located at the edge of the region served by CWG 320, is over-designed for energy-limited wireless nodes located closer to CWG 320). The dynamic configuration of CEWNs 310 (rather than using fixed designs for energy-limited wireless nodes) significantly reduces the total energy cost of the wireless network 300 (e.g., from a cost that is equal to seven times the energy usage of the receiver sensitivity of the energy-limited wireless node farthest from CWG 320 to a cost that is equal to the sum of the individual energy usages of the seven CEWNs 310 where CEWNs 310 are configured to use lower receiver sensitivity and, thus, less energy, with decreases in distance to CWG 320). It will be appreciated that, although primarily described with respect to embodiments in which configuration of CARs 312 is based on channel gains or channel conditions of the CEWNs 310, it will be appreciated that which configuration of CARs 312 and CAT 321 may be based on various other parameters or information. In at least some embodiments, configuration of CARs 312 of CEWNs 310 and CAT 321 of CWG 320 to improve or optimize one or more aspects of communication between the CWG 320 and the CEWN 310 may be performed as depicted and described with respect to FIG. 2.

In at least some embodiments, CWG 320 is configured to control configuration of CWG 320 and CEWNs 310 for single-hop or multi-hop communications between CWG 320 and CEWNs 310 (namely, each of the CEWNs 310 communicates with CWG 320 directly or communicates with CWG 320 indirectly via one or more other CEWNs 310). For example, CWG 320 may determine that direct communication from CWG 320 to CEWNs 310 is more efficient for some CEWNs 310 whereas indirect communication from CWG 320 to CEWNs 310 (via other CEWNs 310) is more efficient for some CEWNs 310. For example, for a first CEWN 310 located at a first distance from CWG 320 and a second CEWN 310 located at a second distance from CWG 320 (where the second distance is greater than the first distance), CWG 320 may determine that, for a wake-up signal intended for the second CEWN 310, transmission of the wake-up signal from CWG 320 to the second CEWN 310 indirectly via the first CEWN 310 (e.g., the CAR 312 of the first CEWN 310 receives the wake-up signal from the CAT 321 of CWG 320 and then the CAT 311 of the CEWN 310 transmits the signal for reception by CAR 312 of the second CEWN 310) is more efficient than transmission of the wake-up signal from CWG 320 to the second CEWN 310 directly (namely, the CAR 312 of the second CEWN 310 receives the wake-up signal from the CAT 321 of CWG 320). As previously discussed, the improved efficiency may be in terms of one or more measures of per-node efficiency (e.g., maximum per-node energy usage, maximum per-node latency, maximum per-node cost, or the like), one or more measures of system level efficiency (e.g., total energy usage, system throughput, system cost, or the like), or the like, as well as various combinations thereof. In continuation of the above-described example, it is noted that use of indirect communication may use less total energy than use of direct communication (since, even though the CAT 311 of the first CEWN 310 needs to transmit in the case of indirect communication, this increase in energy usage is less than the decreased energy usage resulting from the CAT 321 of the CWG 320 being operated at a lower transmit power because it only needs to transmit to the closer first CEWN 310 and the CAR 312 of the CEWN 310 is operated at a lower receive sensitivity since it only needs to be able to receive the wake-up signal form the closer first CEWN 310 rather than from the CWG 320).

The CWG 320 may control configuration of CWG 320 and CEWNs 310 by obtaining configuration input information, determining configurations of CWG 320 (e.g., configurations of configurable elements of CWG 320, such as configurable elements of CAT 321) and CEWNs 310 (e.g., configurations of configurable elements of CEWNs 310, such as CARs 312 of CEWNs 310 and, optionally, CATs 311 of CEWNs 310 that will operate as intermediary nodes for other CEWNs 310) based on the configuration input information, and initiating configuration of CWG 320 and CEWNs 310 based on the determined configurations of CWG 320 and CEWNs 310. The CWG 320 may determine configuration of CWG 320 and CEWNs 310 based on channel gains between the CEWNs 310 and the CWG 320, channel gains between pairs of CEWNs 310 (e.g., for determining efficiency of using CEWNs 310 as intermediaries for indirect communications), available energy information associated with the CEWNs 310 (e.g., the amount of energy remaining on each of the CEWNs 310), available energy information associated with the CWG 320, capabilities or characteristics of CEWNs 310 (e.g., encoding algorithms available on CATs 311, LNAs available on CARs 312, detect and decode algorithms available on CARs 312, or the like), capabilities or characteristics of CWG 320 (e.g., encoding algorithms available on CAT 321, transmit power available on CAT 321, or the like, as well as various combinations thereof), node level objectives (e.g., minimum maximum per-node energy usage, total node energy usage, maximum minimum per-node throughput (spectral efficiency), or the like), network conditions, network objectives (e.g., energy metrics (e.g., maximizing network lifetime by maximizing time to first node failure within wireless system 300, minimizing total energy consumption within wireless system 300, or the like), throughput metrics (e.g., multi-user throughput, average throughput (spectral efficiency), or the like), latency metrics (e.g., all signals received within Y seconds, X percentage of end-to-end delay within Y seconds, or the like), minimizing control signaling overhead, or the like), or the like, as well as various combinations thereof. The CWG 320 may determine configuration of CWG 320 and CEWNs 310 based on partitioning and allocating the overall resources of wireless network 300 to achieve necessary or desirable tradeoffs among performance, costs, energy-efficiency metrics, or the like, as well as various combinations thereof. The CWG 320 may determine configuration of CWG 320 and CEWNs 310 based on optimization of such tradeoffs using one or more of a multi-objective optimization method, linear programming, mixed-integer linear programming (MILP), or the like, as well as various combinations thereof. The CWG 320 may determine configuration of CWG 320 and CEWNs 310 based on use of one or more dynamic algorithms (e.g., Bayesian inference, Game-theoretical analysis, or the like) to analyze network conditions and control configuration of CWG 320 and CEWNs 310 for actual or anticipated dynamic network changes. The CWG 320 may determine configuration of CWG 320 and CEWNs 310 based on energy consumption by enumerating the energy consumed in the node for each configuration (e.g., for a single hop configuration or a multi-hop configuration) and compute the minimum cost over a range of performance requirements. The CWG 320 may determine configuration of CWG 320 and CEWNs 310 by parameterizing receiver sensitivity and transmission range and relating receiver sensitivity and transmission range with achievable throughput and optimize over overall energy consumed. It is noted that consideration of CEWNs 310 to operate as multi-hop intermediaries may make determination of the configuration of CWG 320 and CEWNs 310 an NP-compete optimization problem, e.g., reducing the communication range of a node (e.g., CWG 320 or CEWN 310) causes the required receiver power to be reduced and end-to-end packet delivery may then be achieved via multi-hop networking, however, implementation of multi-hop wireless communication introduces certain overhead (e.g., increasing the number of transmit and receive packets and their related energy and latency cost), eventually amortizing the multi-hop gains and, therefore, it is necessary to understand fundamental limits of multi-hop networking with programmable transceivers that reduces the optimization complexity of deriving a targeted solution in an efficient way. The configuration of CWG 320 and CEWNs 310 results in a topology supporting propagation of wake-up signals from CWG 320 to CEWNS 310.

It will be appreciated that, although primarily depicted and described with respect to embodiments in which the configurations of the CARs 312 of the CEWNs 310 and CAT 321 of CWG 320 are determined in a centralized manner (illustratively, determined by CWG 320 based on information from CEWNs 310 and communicated from CWG 320 to the CEWNs 310), in at least some embodiments at least a portion of the configurations of the CARs 312 of the CEWNs 310 or configuration of CAT 321 of CWG 320 may be determined in a distributed manner (e.g., configuration control functions of CWG 320 may be distributed across some or all of the CEWNs 310). It will be appreciated that there may be various tradeoffs associated with use of centralized or distributed implementations where such tradeoffs are generally expected to favor a centralized approach in most cases (e.g., since it will be less expensive for the CWG 320 to obtain the necessary input information and process the information to provide various network-level optimizations (e.g., optimizing network performance, minimizing total energy cost, minimizing a maximum energy used by any given CEWNs 310 so as to maximize time to failure of the first CEWN 310, or the like, as well as various combinations thereof).

The CWG 320, as discussed above, may control configuration of CWG 320 and CEWNs 310 by obtaining configuration input information, determining configurations of CWG 320 and CEWNs 310 based on the configuration input information, and initiating configuration of CWG 320 and CEWNs 310 based on the determined configurations of CWG 320 and CEWNs 310. The CWG 320 may be configured to perform such functions within the context of various trigger conditions, such as network establishment, network join operations (e.g., where a new CEWN 310 joints an existing network), network leave operations (e.g., where an existing CEWN 310 leaves an existing network), or the like.

The CWG 320 may be configured to facilitate network establishment for a set of nodes (where, here, the nodes include CWG 320 and CEWNs 310, i.e., the CWG 320 includes gateway functionality but also operates in a manner similar to CEWNs 310). The CWG 320 may be configured to execute a network initialization procedure to collect network information about the network, such as network topology information (e.g., node interconnectivity, inter-node path loss, or the like), node characteristics information for nodes of the network (e.g., node specifications, node parameters, or the like), or the like, as well as various combinations thereof. The CWG 320 may be configured to use the collected network information to perform various functions, such as to determine node configurations for the nodes, to determine triggers for transitions between node configurations by the nodes, to determine optimal sets of intermediaries under various conditions, or the like, as well as various combinations thereof. An exemplary embodiment of a method by which CWG 320 may facilitate network establishment for a group CEWNs 310 (where CWG 320 also operates as one of the CEWNs 310, e.g., the network controller functionality is implemented within one of the CEWNs 310) is depicted and described with respect to FIG. 4.

Figure 4:
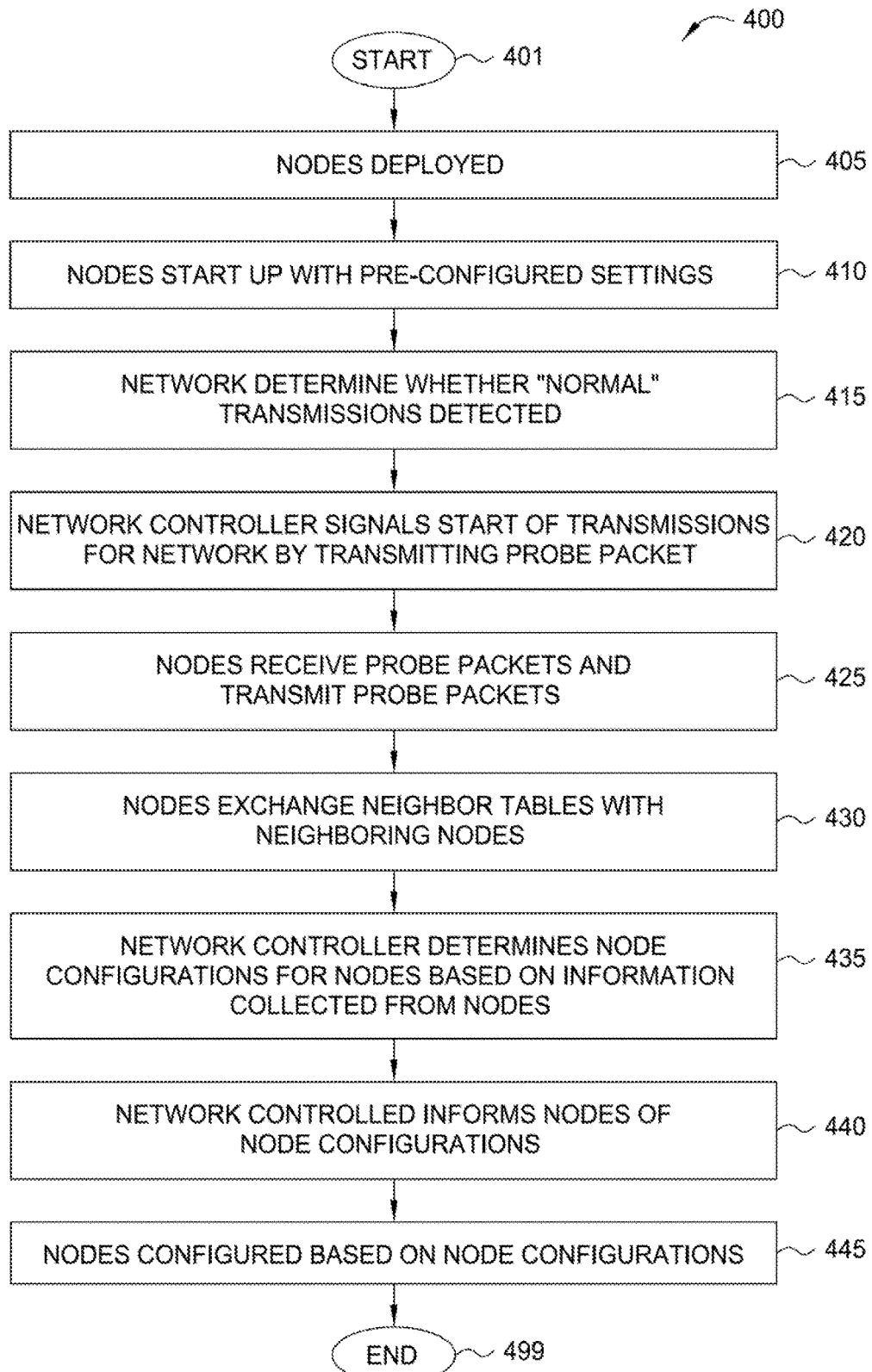
FIG. 4 depicts an exemplary embodiment of a method by which a network controller facilitates network establishment for a group of nodes.

FIG. 4 depicts an exemplary embodiment of a method by which a network controller facilitates network establishment for a group of nodes. It is assumed that the network controller is implemented within one of the nodes. As noted above, the network controller may be network controller functions of CWG 320 and the nodes may include CWG 320 and CEWNs 310. It is also assumed that each of the nodes includes a neighbor table. It will be appreciated that, although primarily depicted and described herein as being performed serially, at least a portion of the steps of method 400 may be performed contemporaneously or in a different order than as depicted in FIG. 4.

At step 401, method 400 begins.

At step 405, the nodes are physically deployed.

At step 410, the nodes start up with pre-configured settings (e.g., factor default or pre-deployment settings) and listen for any transmissions. The pre-configured settings for a given node are assumed to include the highest receiver sensitivity setting for the given node.

At step 415, each of the nodes determines whether "normal transmissions" are detected. If a given node detects "normal transmissions", it is an indication that the network has already been established and the given node may then switch to a "join network" mode (as discussed with respect to FIG. 5). Here, it is assumed that none of the nodes detects "normal transmissions" and, thus, that the establishment of the network continues.

At step 420, the network controller signals the start of transmissions for the network by transmitting a probe packet. The probe packet may include the following: (1) Identity (which may be globally unique), (2) Transmit Power, (3) Node Capabilities (e.g., a URL to a machine readable functional description of the node specifications of the nodes), (4) Neighbors Discovered (the number of neighbors the node will eventually report as being able to successfully decode the probe packet), and (5) Gateway Flag (e.g., set to a first value (e.g., "1") if the node is the gateway and set to a second value (e.g., "0") if the node is not the gateway). It is noted that the probe packet may include less or more, as well as different, information.

At step 425 (described as a single step for purposes of clarity), the nodes receive probe packets and transmit probe packets. The probe packets include information similar to that of the initial probe packet sent by the network controller. If a node is able to successfully decode a received probe packet, the node stores at least a portion of the contents of the probe packet in its neighbor table and transmits its own probe packet. It will be appreciated that distributed random media access control capabilities (e.g., CSMA/CA, Slotted Aloha, or the like) may be used to reduce the chance of collisions of probe packets. In between transmissions, the nodes listen with highest sensitivity for probe packets from neighbor nodes. For those nodes that are outside of the range of the initial probe packet of the network controller, the probe packets of other nodes will eventually cascade such that all of the nodes eventually receive probe packets. This cascading of probe messages throughout the network may continue until each of the nodes (1) hears probe packets of its neighbor nodes repeated a threshold number of times without any change in the "Nodes Discovered" information and (2) does not hear any new probe packets.

At step 430, the nodes exchange neighbor tables with neighboring nodes. The nodes forward their neighbor tables to neighboring nodes with the following priority (highest to lowest): gateway, node with highest neighbor count (where random selection or other suitable forms of tiebreakers could be used if multiple neighbor nodes have the same neighbor count. The nodes, upon receiving neighbor tables from neighboring nodes, merge the received neighbor tables with their own respective tables. The nodes may then continue to forward their neighbor tables to neighboring nodes. In this manner, the network controller, which is implemented at one of the nodes, collects information needed in order to determine node configurations of the nodes, as discussed further below.

At step 435, the network controller determines node configurations for the nodes based on information collected from the nodes. The node configurations for the nodes may be the optimal set of node configurations for the network. The network controller also may determine triggers to be used to change node configurations of the nodes based on information collected from the nodes of the network. The network controller also may determine optimal sets of intermediary nodes for multi-hop communications, as discussed further below. As discussed above, the information collected from the nodes of the network may be the information maintained in the neighbor table of the node on which the network controller is implemented (e.g., populated based on exchanging of the probe messages and associated exchanging of the neighbor tables between neighboring nodes). The network controller may make one or more such determinations based on one or more trigger conditions (e.g., exchange of probe messages or neighbor tables between the nodes has been performed for a threshold length of time, the network controller does not received any additional changes from neighboring nodes for a threshold period of time, or the like). The node configurations may specify configurable auxiliary transmitter and configurable auxiliary receiver configurations for the nodes.

At step 440, the network controller informs the nodes of the node configurations determined for the nodes, respectively.

At step 445, the nodes are configured based on the node configurations reported by the network controller. The nodes may configure themselves or may be considered to be configured by the network controller. The nodes then operate in accordance with the applied node configurations, respectively.

At step 499, method 400 ends. It will be appreciated that, although primarily depicted and described as ending (for purposes of clarity), method 400 (or portions thereof of other methods implementing portions thereof) may continue to operate in order to exchange updated node information which the network controller may then use to continue to improve or even optimize the node configurations and, optionally, one or more of node configuration change triggers, optimal sets of intermediary nodes, or the like, as well as various combinations thereof.

The CWG 320 may be configured to facilitate a network join operation in which a new node joins an existing network or nodes (where, here, the new node is a CEWN 310 and gateway functionality of CWG 320 facilitates joining of the CEWN 310 to an existing network including one or more CEWNs 310). The CWG 320 may be configured to execute a network join procedure to collect information about the joining node and, optionally, about one or more other nodes of the network. The CWG 320 may be configured to use the collected information to perform various functions, such as to determine the node configurations for the new node, to determine one or more new node configurations for one or more of the existing nodes (as additional of the new node to the network may enable or require different configurations or one or more existing nodes, such as use of one or more multi-hop paths or the like), to determine triggers for transitions between node configurations by the new node, to determine new triggers for transitions between node configurations by one or more of the existing nodes, or the like, as well as various combinations thereof. An exemplary embodiment of a method by which CWG 320 may facilitate a node join operation in which a new CEWN 310 joins an existing network including CWG 320 and CEWNs 310 (where CWG 320 also operates as one of the CEWNs 310, e.g., the network controller functionality is implemented within one of the CEWNs 310) is depicted and described with respect to FIG. 5.

Figure 5:
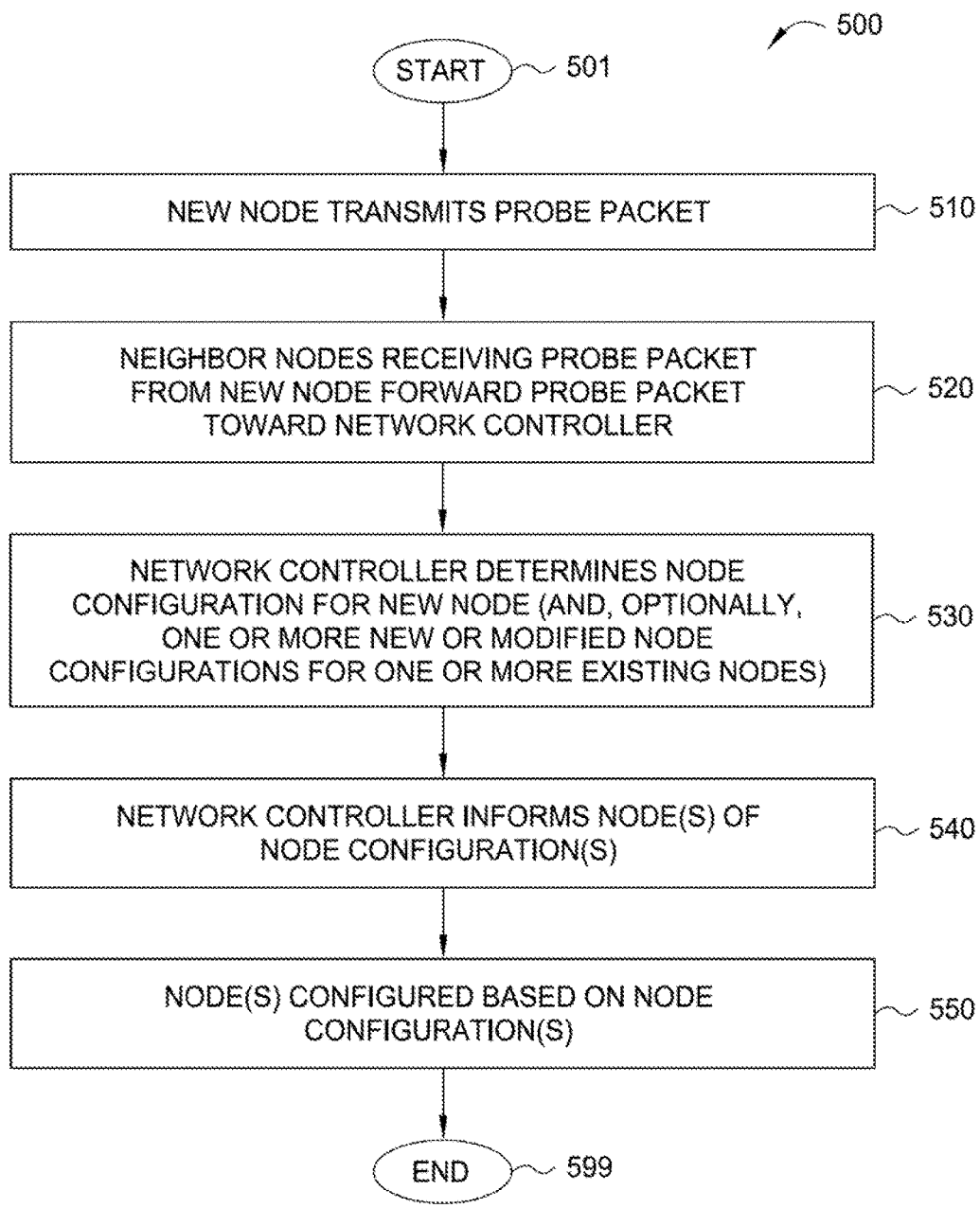
FIG. 5 depicts an exemplary embodiment of a method by which the network controller of an existing network enables a new node to join the existing network.

FIG. 5 depicts an exemplary embodiment of a method by which the network controller of an existing network enables a new node to join the existing network. It is assumed that the network controller is implemented within one of the nodes. It is also assumed that the new node includes a neighbor table. It will be appreciated that, although primarily depicted and described herein as being performed serially, at least a portion of the steps of method 500 may be performed contemporaneously or in a different order than as depicted in FIG. 5.

At step 501, method 500 begins.

At step 510, the new node transmits a probe packet. The probe packet may include a node identifier of the new node, an indication that the new node is requesting to join the network, a current transmit power of the new node, or the like, as well as various combinations thereof.

At step 520, neighbor node(s) receiving the probe packet from the new node forward the probe packet toward the network controller. It is noted the delivery of the probe packet from the new node to the network controller may require use of one or more hops between the new node and the network controller.

At step 530, the network controller determines a node configuration for the new node and, optionally, may determine one or more new or modified node configurations for one or more existing nodes of the network. The network controller determines the node configuration(s) based on the information collected from the new node of the network and information previously collected from the existing nodes of the network (e.g., maintained in the neighbor table of the node on which the network controller is implemented). The node configuration(s) for the node(s) may be the optimal set of node configurations for the network. The network controller also may determine, based on the information collected from the new node of the network and information collected from the nodes of the network (e.g., maintained in the neighbor table of the node on which the network controller is implemented), triggers to be used to change node configurations of the nodes (e.g., new triggers, modification of existing triggers, or the like). The network controller also may determine, based on the information collected from the new node of the network and information collected from the nodes of the network (e.g., maintained in the neighbor table of the node on which the network controller is implemented), optimal sets of intermediary nodes.

At step 540, the network controller informs the node(s) of the node configuration(s) determined for the node(s), respectively.

At step 550, the new node is configured based on the node configuration determined for the new node and, optionally, where one or more new or modified node configurations are determined for one or more existing nodes of the network, the existing node(s) of the network may be configured based on the new or modified node configuration(s). The nodes of the network, including the new node, may then operate in accordance with the applied node configurations (e.g., previously applied prior to the new node joining or newly applied responsive to the new node joining).

At step 599, method 500 ends.

It will be appreciated that, although primarily presented with respect to embodiments in which a node configuration update is performed for nodes of the network at the time that a new node joins the network, in at least some embodiments, node configuration updates may not be performed at the time that a new node joins the network; rather, node configuration updates may be performed for nodes of the network periodically, responsive to other types of trigger events, or the like, as well as various combinations thereof. In such embodiments, any new node that requests to join the network following a previous node configuration update performed for the network may be added to the network in conjunction with a next node configuration update performed for the network. It will be appreciated that, in at least some embodiments, a combination of such techniques may be used to enable nodes to join the network (e.g., enabling some nodes to join right away while requiring the other nodes wait until a next node configuration update to be performed for the network). It will be appreciated that the implementation of such embodiments may depend on various factors, such as the arrival rate of new nodes to the network (e.g., allowing new nodes to join the network right away for a relatively high arrival rate of new nodes to the network or allowing nodes to join the network at periodic update times for a relatively low arrival rate of new nodes to the network), node priority (e.g., allowing relatively high priority nodes to join the network right away while requiring relatively low priority nodes to wait until a next node configuration update to be performed for the network), trade-off analysis between default node configurations (e.g., used by new nodes prior to receiving node configurations determined by the network controller) and improved or optimal node configurations (e.g., node configurations determined by the network controller), or the like, as well as various combinations thereof.

It will be appreciated that, although primarily depicted and described with respect to embodiments in which CWG 320 is configured to facilitate management of network modifications where CEWNs 310 are forming a new network or joining an existing network, CWG 320 is configured to facilitate management of network modifications for other types of network modifications (e.g., when CEWNs 310 leave an existing network or other types of network modifications).

The CWG 320, as discussed above, may be configured to facilitate configuration of CEWNs 310 as intermediary nodes supporting multi-hop delivery of wake-up signals from CWG 320 to CEWNs 310. The operation of CEWNs 310 as intermediary nodes supporting multi-hop delivery of wake-up signals provides additional design space freedom for determining node configurations that improve or optimize one or more aspects of wireless network 300. For example, as discussed above, use of CEWNs 310 as intermediary nodes supporting multi-hop delivery of wake-up signals enables reductions in the maximum distance between transmitting nodes and receiving nodes, such that the transmit power of CATs 311 of transmitting CEWNs 310 may be reduced and the detection sensitivity of the CARs 312 of receiving CEWNs 310 may be reduced.

The selection of CEWNs 310 to operate as intermediary nodes may be performed in various ways.

The selection of CEWNs 310 to operate as intermediary nodes may be performed in a centralized manner (e.g., by CWG 320 for the entire wireless network 300), in a quasi-centralized manner (e.g., by dividing the wireless network 300 into partitions and selecting intermediary nodes for the respective partitions, which may be performed by CWG 320 for the wireless network 300, by designated CEWNs 310 of the respective partitions, or the like), in a decentralized manner (e.g., via communication/negotiation between CEWNs 310 of the wireless network 300), or the like, as well as various combinations thereof. It will be appreciated that, while the process for selecting intermediary nodes may be the same or similar for such implementations, there may be tradeoffs in the use of such implementations (e.g., in terms of overhead of configuring the CEWNs 310 selected to operate as intermediary nodes, optimization of use of intermediary nodes to support communication between nodes of the wireless network 300, or the like).

Figure 6:
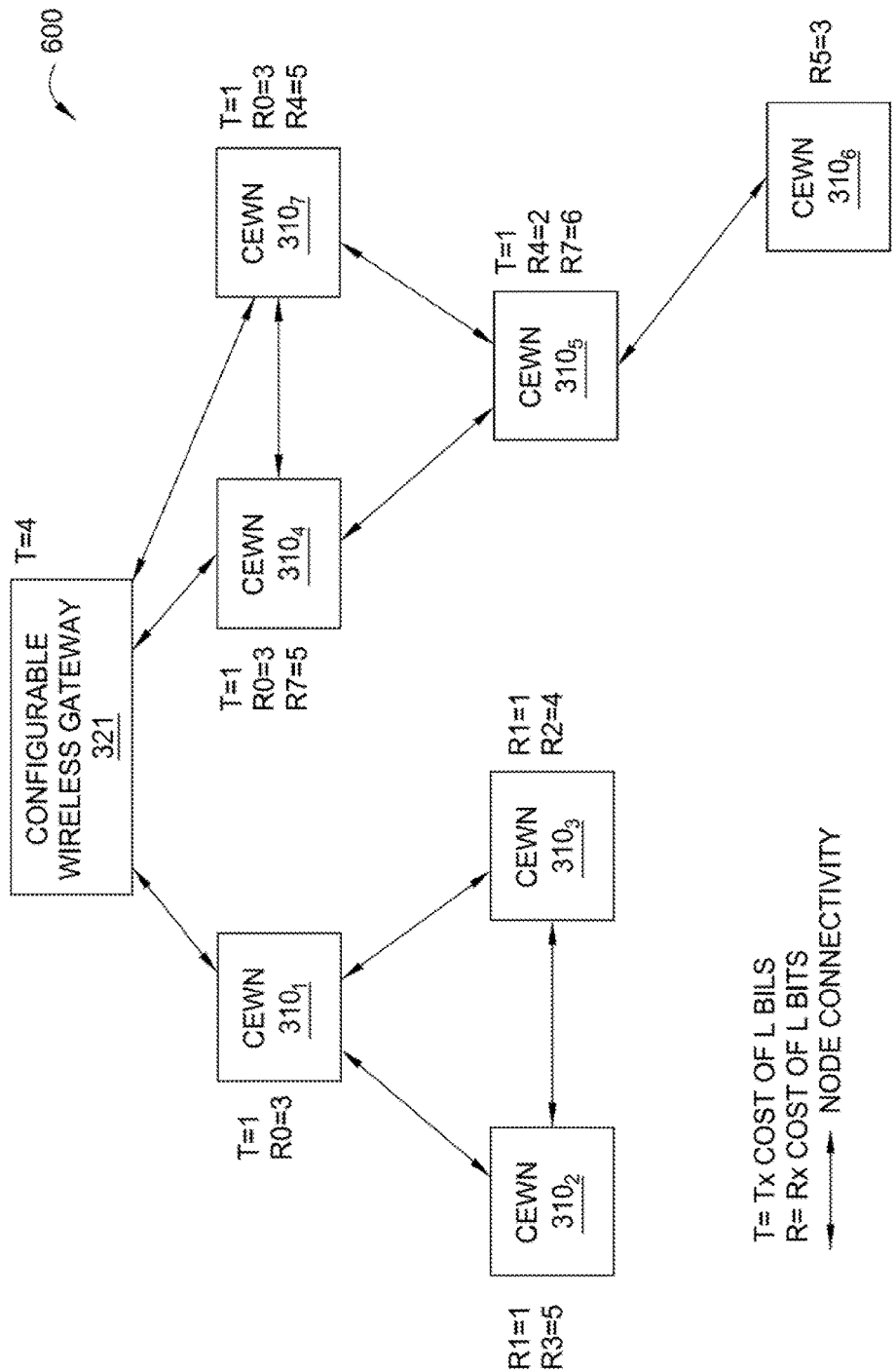
FIG. 6 depicts an exemplary multi-hop network topology within the context of the exemplary wireless system of FIG. 3.

The selection of CEWNs 310 to operate as intermediary nodes may be performed based on modeling. The single-hop and multi-hop communication networks, and energy models of the single-hop and multi-hop communication networks, may be modeled. This modeling may be performed while taking into account CATs 311 and CARs 312 of the CEWNs 310 of the wireless network 300. It will be appreciated that different configurations of CATs 311 and CARs 312 of the CEWNs 310 may generate different multi-hop network topologies with their respective energy cost in every node and link-level connectivity among nodes. It is assumed that each CEWN 310 has multiple possible configurations (e.g., at least one for each of the prior and post hosts supported by the CEWN 310). The use of such network information in combination with node-to-node propagation observations (e.g., neighbor discovery) may lead to the establishment of energy-efficient multi-hop communication. An exemplary multi-hop network topology, within the context of the exemplary wireless system 300 of FIG. 3, is depicted in FIG. 6 which is discussed further below. As discussed herein, various tradeoffs associated with different configurations of CARs 312 may be evaluated. It is noted that the number of possible combinations of CARs 312 may be about $(X)^n$ where X is the number of alternatives for receiver power configuration and n is the number of CEWNs 310. It is further noted that the search space of this problem may be significant if the value of n is large. In at least some embodiments, the optimization complexity of this problem may be reduced based on one or more of: (1) a determination that a data sink is not energy-limited (e.g., an advantage that may be used to extend the first hop distance as long as possible in transmit power and coding areas, thereby reducing the n parameter), (2) making an assumption of network conditions and analyzing tradeoffs between the increase of multi-hop count and energy efficiency in the wireless network in order to derive a set of optimization rules for the problem above (e.g., this tradeoffs analysis derives a multi-hop limit of k hops with CARs 312 given a communication distance K, (3) using tradeoffs analysis in combination with one or more other inputs (e.g., one or more of node channel gain, network graph, neighbor discovery, or the like) in order to derive a limited set of CAR 312 configurations and, thus, reducing the search space problem, or (4) devising a heuristic greedy search algorithm for the tradeoffs analysis to try to achieve the energy optimization objective (which also may take into account whether the communications are unicast or multicast, since this is expected to have direct impacts on the configuration of CARs 312). It is further noted that, although omitted from the discussion above for purposes of clarity, various tradeoffs associated with different configurations of CATs 311 may be evaluated (possibly in combination with evaluation of different configurations of CARs 312 as discussed above).

The selection of CEWNs 310 to operate as intermediary nodes may be performed in a manner for rotating responsibility for operating as intermediary nodes between CEWNs 310. This enables the burden of transporting traffic for other CEWNs 310 (e.g., additional energy use at the intermediary nodes) to be shared among CEWNs 310. The rotation of responsibility for operating as intermediary nodes may be timer-based, event-based (e.g., an event on the node (e.g., a sensor event for a sensor node, a detector event for a detector node, or the like), a network event (e.g., increased traffic, a congestion condition, or the like), or the like), or the like. The rotation of responsibility for operating as intermediary nodes may be performed for a set of intermediary nodes associated in some way (e.g., based on availability of multiple paths between source destination node pairs or the like). The rotation of responsibility for operating as intermediary nodes may be coordinated by CWG 320. The rotation of responsibility for operating as intermediary nodes may be coordinated by the acting intermediary node, such that the acting intermediary node may transition responsibility to a standby intermediary node which then becomes the acting intermediary node for the set of intermediary nodes (with the previously acting intermediary node transitioning to become a standby intermediary node for the set of intermediary nodes). For example, given a network that supports two paths for forwarding of wake-up signals from node 0 to node 6 (a first path including nodes 0, 4, 5, 6 and a second path including nodes 0, 7, 5, 6), nodes 4 and 7 may be considered to form a set of related intermediary nodes related to forwarding wake-up signals from node 0 to node 6 and, thus, intermediary node responsibility may be rotated between nodes 4 and 7 to support forwarding of traffic between nodes 6 and 0. The rotation of intermediary nodes may include a change in the node configuration of one or more of the intermediary nodes for which intermediary node responsibility is rotated (e.g., pathloss between the intermediary node and the connected nodes may be different, thereby requiring a different operating point in order to minimize energy consumption), which may be determined locally by the intermediary nodes, determined by the network controller and reported to the intermediary nodes, or the like. In at least some embodiments, a first CEWN 310 that is configured to operate as an intermediate node at least for a second CEWN 310 may receive a wake-up signal via a CAR 312 of the first CEWN 310, transmit the wake-up signal toward the second CEWN 310 (e.g., via a CAT 311 of the second CEWN 310, via a main communication module of the second CEWN 310, or the like), transition from operating as an active intermediary node to operating as a standby intermediary node (e.g., responsive to a local determination by the first CEWN 310 to switch from operating as an active intermediary node to operating as a standby intermediary node, responsive to an instruction or request from another node such as from CWG 320 or a third CEWN 310 configured to assume the role of the active intermediary node for the second CEWN 310, or the like), and, optionally, send a transition request or instruction message toward a third CEWN 310 configured to assume the role of the active intermediary node for the second CEWN 310.

FIG. 6 depicts an exemplary multi-hop network topology within the context of the exemplary wireless system of FIG. 3. The multi-hop network topology 600 is based on selection of certain CEWNs 310 to operate as intermediary nodes as discussed above. As depicted in FIG. 6, the multi-hop network topology 600 results in connectivity between CWG 320 and CEWN 301$_1$, CEWN 301$_1$ and CEWN 301$_2$, CEWN 301$_1$ and CEWN 301$_3$, CEWN 301$_2$ and CEWN 301$_3$, CWG 320 and CEWN 301$_4$, CWG 320 and CEWN 301$_4$, CWG 320 and CEWN 301$_7$, CEWN 301$_4$ and CEWN 301$_7$, CEWN 301$_4$ and CEWN 301$_5$, CEWN 301$_7$ and CEWN 301$_5$, and CEWN 301$_5$ and CEWN 301$_6$. As further depicted in FIG. 6, transmit costs (T) and receive costs (R) associated with various nodes may be determined and used for selection of certain CEWNs 310 to operate as intermediary nodes. In the multi-hop network topology 600, for example, for CWG 320 the transmit cost is four (T=4), for CEWN 310$_1$ the transmit cost (for transmitting to CEWN 310$_2$ or CEWN 310$_3$) is one (T=1) and the receive cost (for receiving from CWG 320) is three (R0=3), for CEWN 310$_2$ the receive cost for receiving from CEWN 310$_1$ is one (R1=1) and the receive cost for receiving from CEWN 310$_3$ is five (R3=5), and so forth.

It will be appreciated that, although primarily depicted and described herein with respect to embodiments in which the CEWNs 310 include configurable auxiliary transceivers for use in forwarding wake-up signals when operating as intermediary nodes supporting multi-hop delivery of the wake-up signals, in at least some embodiments a CEWN 310 may use a main communication module for forwarding wake-up signals when operating as intermediary nodes supporting multi-hop delivery of wake-up signals (e.g., if the CEWN 310 does not include an auxiliary transceiver, if the CWG 320 determines that delivery of a wake-up signal using the main communication module is more efficient than delivery of the wake-up signal using the auxiliary transceiver, or the like).

As discussed herein, various types of CAT configurations and CAR configurations may be supported. The performance of the various types of CAR configurations may be evaluated based on energy performance (which may be based on various energy performance metrics). The evaluation of the performance of the various types of CAR configurations based on energy performance may be further understood by way of an example in which the wireless network includes a wireless gateway and two energy-limited wireless nodes (denoted as node 1 and node 2, and each including a CAR, respectively) and, further, in which three different options for CAR configuration are evaluated and compared based on energy performance, a discussion of which follows. In this example, the three auxiliary receiver configurations for which performance is evaluated include:

(1) Option 1: The CARs of the two energy-limited wireless nodes are configured for the worst-case energy-limited wireless node, which is expected to result in a single-hop network with one CAR configuration used by each of the two energy-limited wireless nodes;

(2) Option 2: The CARs of the two energy-limited wireless nodes are configured according the channel conditions of the two energy-limited wireless nodes (e.g., distance, radio propagation, environment, or the like, as well as various combinations thereof), which is expected to result in a single-hop network with two CAR configurations for the two energy-limited wireless nodes; and (3) Option 3: The CARs of the two energy-limited wireless nodes are configured according network conditions and objectives, which may result in a multi-hop network with dynamic CAR configurations for the two energy-limited wireless nodes.

In this example, for purposes of clarity, it is assumed that only the CAR configurations of the nodes are configurable (and that any CATs or other transmitter modules which may be available at the wireless gateway or either of the two energy-limited wireless nodes are not configurable) and, further, it is assumed that homogeneous communication conditions exist between the two energy-limited wireless nodes (e.g., use of the same transmit power, use of physical layer signal encoding, and interference-free multi-access).

In this example, in which three different options for CAR configuration are evaluated and compared based on energy performance, the following energy model for downlink packet reception at the CAR may be used:

$$E_{node} = E^{(c)}_{fixed} + E^{LNA}_l = E^{(c)}_{fixed} + l \times E^{LNA} \quad (\text{Eq. 1})$$
$$R/N = \log_2(1 + SNR)$$
$$SNR = \log_2(1 + P^{Tx}_i l_i r_i m_i)$$
$$l_i = (2^{R/N} - 1)(P^{Tx}_i r_i m_i)^{-1}$$

$$E_{all} = E_1 + E_2 = 2E^{(c)}_{fixed} + E^{LNA} \sum_{i=1}^{2} l_i = \quad (\text{Eq. 2})$$
$$2E^{(c)}_{fixed} + E^{LNA} \sum_{i=1}^{2} (2^{R/N} - 1)(P^{Tx}_i r_i m_i)^{-1}$$

In this energy model, the energy cost of an energy-limited wireless node receiving L bits is $E_{node}$, which is modeled as a sum of (a) fixed energy overhead for receiver circuits (e.g., PLL, tuned circuit) of the energy-limited wireless node (denoted as $E^{(c)}_{fixed}$) and (b) variable energy cost depending on a number of cascaded LNAs of the energy-limited wireless node (denoted as $E^{LNA}_l$). The energy cost model in Eq. 1 is a function of LNA that controls auxiliary receiver sensitivity and links to its associated energy cost. A linear relationship exists between the number of LNAs $I_i$ and receiver energy cost $E^{LNA}_l$. Receiver gain $r_i$ also depends on LNAs. For simplicity, it is assumed that the receiver gain is solely dependent on the number of LNAs and that they have a linear correlation (although it will be appreciated that, in reality, an LNA simultaneously amplifies the signal and noise power so that gain of cascaded LNAs gradually reduces). In addition to LNAs, one or more other components (e.g., PLLs or the like) may be traded for the decrease in receive power if a relatively simple modulation technique is used. Let $m_i$ be channel gain divided by AWGN channel noise at energy-limited wireless node i and let $P^{Tx}_i$ be transit power of energy-limited wireless node i that takes into account PA efficiency and SNR gap between Shannon capacity and real data rate. With these system assumptions, $E^{(c)}_{fixed}$, $E^{LNA}$, $P^{Tx}_i$, and $r_i$ are fixed.

In this example, given a targeted spectral efficiency R/N and $m_1 > m_2$, the total node energy cost of the wireless network (denoted as $E_{all}$) may be derived as follows:

$$E_{all}(\text{Option 1}) = 2E^{(c)}_{fixed} + 2E^{LNA}(2^{R/N} - 1)(P^{Tx}_i r_i m_2)^{-1}$$

(this uses 1-hop delivery for each of the two energy-limited wireless nodes, which includes two receive operations in nodes 1 and 2, respectively);

$$E_{all}(\text{Option 2})=2E_{fixed}^{(c)}+E^{LNA}(2^{R/N}-1)(P_i^{Tx}r_i)^{-1}(m_1^{-1}+m_2^{-1}) \quad \text{(Eq.3)}$$

(this is uses 1-hop delivery for each of the two energy-limited wireless nodes, which includes two receive operations in nodes 1 and 2, respectively); and $$E_{all}(\text{Option 3})=2E_{fixed}^{(c)}+E^{LNA}(2^{R/N}-1)(P_i^{Tx}r_i)^{-1}(m_1^{-1}+m_{1,2}^{-1})+E^{Tx} \quad \text{(Eq.4)}$$

(this uses 2-hop delivery and, thus, includes two receive operations and one transmit operation in nodes 1 and 2, where $E^{Tx}$ is the fixed transmit energy cost for L bits and $m_{1,2}$ is channel gain between node 1 and node 2).

In this example, given the derivations of the total node energy cost in the wireless network (again, denoted as $E_{all}$) for the three different options for CAR configuration, various conclusions may be drawn. First, it is noted that, since $m_1$ is larger than $m_2$, $E_{all}$(Option 1)>$E_{all}$(Option 2). Second, it is noted that, if Eq. (3)>Eq. (4) (i.e., Option 3 uses less total node energy than Option 2), then Option 3 will outperform Option 2 in energy savings if the following condition (denoted as Eq. (5)) is satisfied:

$$m_{1,2} > \frac{m_2 E^{LNA}(2^{R/N}-1)(P_i^{Tx}r_i)^{-1}}{E^{LNA}(2^{R/N}-1)(P_i^{Tx}r_i)^{-1}-E^{Tx}m_2} \quad \text{(Eq. 5)}$$

For example, if the value of $m_{1,2}$ is greater than 0.06 and values of $m_1$, $m_2$, $E^{Tx}$, $E^{LNA}$, R/N, $P^{Tx}$, and r are 1, 0.01, 30 µJ, 3 µJ, 0.1, 30 mW, and 20, respectively, the total node energy of Option 3 will be lower than the total node energy of Option 2.

This simple example illustrates that a CAR of a node is able to reduce the sum of node energy for the node while meeting the throughput and range requirements of the node.

It will be appreciated that, although the above example is primarily described with respect to evaluation of a specific type of energy metric (namely, total node energy), the example above may be adapted for evaluation of other types of energy metrics (e.g., minimization of maximum node energy (e.g., a Min-Max problem), minimization of average node energy, or the like) which also may favor Option 3 more than Option 2.

It will be appreciated that, although primarily presented herein with respect to embodiments in which transmission of wake-up signals between nodes is performed using unicast (1-to-1), in at least some embodiments transmission of wake-up signals between nodes may be performed using multicast. In general, multicast (1-to-M) provides a mechanism for a data source to communicate with multiple leaf nodes. It is noted that multicast may have various advantages over unicast, such as less repeated transmissions (which is expected to reduced energy cost and interference), use of flexible encoding techniques, address sharing (which may improve signaling efficiency when a subgroup is addressed as a collective, such as all sensors in the same location or the like), and so forth. It is also noted that the design of multicast communication also may be related to IoT device addressing. Accordingly, in at least some embodiments, multicast communication, scalable addressing, and encoding options may be integrated to support use of intermediary nodes for a large scale network.

It will be appreciated that, although primarily presented herein with respect to embodiments in which an energy-limited wireless node receives a wake-up signal when the wake-up signal is intended for that energy-limited wireless node, there may be situations in which an energy-limited wireless node receives a wake-up signal that is not intended for that energy-limited wireless node (e.g., a wireless gateway may broadcast a wake-up signal that is intended for only a subset of energy-limited wireless nodes in the vicinity of the wireless gateway, an energy-limited wireless node operating as an intermediary node for other energy-limited wireless nodes may receive a wake-up signal and transmit the wake-up signal where the wake-up signal is intended for only a subset of energy-limited wireless nodes in the vicinity of that energy-limited wireless node, or the like). In at least some embodiments, an energy-limited wireless node may be configured to support early address decoding for energy savings. It is assumed that the energy-limited wireless node has associated therewith an address or addresses which the energy-limited wireless node may use to determine whether received messages are intended for delivery to the energy-limited wireless node (e.g., in which case such messages are to be handled by the energy-limited wireless node) or not intended for delivery to the energy-limited wireless node (e.g., in which case such messages may be ignored by the energy-limited wireless node). For example, the addresses may include node identifiers for unicast messages, multicast addresses for multicast messages, or the like, as well as various combinations thereof. It is also assumed that an address of a received message, which the energy-limited wireless node may use to determine whether received messages are intended for delivery to the energy-limited wireless node, may be received in portions (e.g., one bit at a time, two bits at a time, four bits at a time, one byte at a time, or the like). The energy-limited wireless node may support early address decoding by evaluating each portion of the address that is received in order to determine whether or not the message could be intended for delivery to the energy-limited wireless node and, based on a determination that the message is not intended for delivery to the energy-limited wireless node (e.g., based on the portion(s) of the value received thus far, it is determined that the value cannot match any of the values associated with the energy-limited wireless node), may enter a low power state. This may be further understood by way of a simple example of a node that has associated therewith a unique node identifier address 0100 and a multicast address 1000. In this example, it is assumed that an address may be received by the energy-limited wireless node one bit at a time. In this example, it is assumed that the address of the message is 1100, transmitted from left to right in time. In this example, upon receipt of the first bit of the address, the energy-limited wireless node is aware that the unique node identifier address is not being transmitted. Similarly, in this example, upon receipt of the second bit of the address, the node is aware that the multicast address is not being transmitted. Thus, since this is the complete set of addresses for the energy-limited wireless node, the energy-limited wireless node does not need to receive the other two bits of the address of the message being transmitted and, thus, the energy-limited wireless node can enter a low power state before receiving and processing the other two bits of the address of the message being transmitted. It will be appreciated that such embodiments may be used by energy-limited wireless nodes to perform early address decoding for other types of signals or messages. It will be appreciated that such embodiments may be used by other types of nodes to perform early address decoding for various types of signals or messages.

It will be appreciated that, although primarily presented herein with respect to embodiments in which energy-limited wireless nodes include CATs and CARs which may be configured in various ways, energy-limited wireless nodes may include fewer or more configurable components or functions. For example, an energy-limited wireless node may include a CAR and a main receiver, a CAR and a main transmitter, a CAR and a main transceiver, a CAT and a main receiver, a CAT and a main transmitter, a CAT and a main transceiver, a configurable auxiliary transceiver and a main receiver, a configurable auxiliary transceiver and a main transmitter, a configurable auxiliary transceiver and a main transceiver, a CAR and a configurable main receiver (e.g., where the configurable main receiver also may be configured to support reception of wake-up signals), a CAR and a configurable main transmitter (e.g., where the configurable main transmitter also may be configured to support transmission of wake-up signals, such as when the energy-limited wireless node is operating as an intermediary node supporting multi-hop propagation of wake-up signals), a CAR and a configurable main transceiver (e.g., where the configurable main transceiver also may be configured to support reception and/or transmission of wake-up signals), a CAT and a configurable main receiver (e.g., where the configurable main receiver also may be configured to support reception of wake-up signals), a CAT and a configurable main transmitter (e.g., where the configurable main transmitter also may be configured to support transmission of wake-up signals, such as when the energy-limited wireless node is operating as an intermediary node supporting multi-hop propagation of wake-up signals), a CAT and a configurable main transceiver (e.g., where the configurable main transceiver also may be configured to support reception and/or transmission of wake-up signals), or the like, as well as various combinations thereof. Thus, given the various options for capabilities of the energy-limited wireless nodes (as well as the various ways in which the functions of the energy-limited wireless nodes may be implemented, references herein to receivers and transmitters may be read more generally as references to receiver modules or functions and transmitter modules or functions, respectively, which may be combined in various ways (e.g., using various combinations of hardware, firmware, software, or the like) to provide receiver modules or functions and transmitter modules or functions as discussed herein. Various combinations of such energy-limited wireless nodes may be used together within a wireless network, and may be configured based on information describing the capabilities of the various energy-limited wireless nodes.

It will be appreciated that, although primarily presented with respect to embodiments in which an energy-limited wireless node includes configurable components or functions supporting propagation of wake-up signals in the downstream direction, in at least some embodiments an energy-limited wireless node may include one or more configurable components or functions which may be configured to support propagation of other types of signals or messages in the downstream direction. It will be appreciated that, although primarily presented with respect to embodiments in which an energy-limited wireless node includes configurable components or functions supporting propagation of signals or messages in the downstream direction, in at least some embodiments an energy-limited wireless node may include one or more configurable components or functions which may be configured to support propagation of signals or messages in the upstream direction. In at least some embodiments, for example, an energy-limited wireless node may support a configurable main receiver, a configurable main transmitter, a configurable main transceiver, or the like, as well as various combinations thereof. It will be appreciated that various receiver components or functions or transmit components or functions (or various combinations thereof) may support different configurations for different types of communication (e.g., wake-up signals, bearer traffic, or the like), for different directions of communication (e.g., downstream, upstream, or the like), or the like, as well as various combinations thereof.

Various embodiments depicted and described herein provide various advantages. Various embodiments depicted and described herein provide network architecture and techniques which may be used to efficiently overcome the sensitivity gap between an ultra low power auxiliary receiver and its complementary high performance main transceiver, thereby enabling the benefits of low latency, high throughput, long range communication at low power consumption and low cost. Various embodiments depicted and described herein enable simultaneous support for both high range and high throughput, thereby enabling realization of the benefit of the low latency of an auxiliary radio without sacrificing throughput or range and without sustaining a significant increase in power consumption (as opposed to solutions in which significant sacrifices in at least one of these three variables is necessary to maintain low latency operation). For example, in existing auxiliary radios the addition of an LNA to increase sensitivity of the auxiliary radio may increase power consumption by a factor of 10 and, thus, reduce the lifetime of the auxiliary radio by a factor of 10; whereas, by contrast, various embodiments depicted and described herein which support dynamic switching between receiver configurations enable support for high power operation of receivers with minimal decreases in lifetime and throughput and minimal increases in latency (e.g., using a low power state as a default state and only switching to a high power state when needed, such as where the LNA of the auxiliary receiver only needs to be on for a small fraction of the total time (e.g., 0.1% of the total time, such that $1*0.999+10*0.001=1.009$ factor increase, or 0.9% increase, in power consumption)). Various embodiments depicted and described herein may provide various other advantages.

Figure 7:
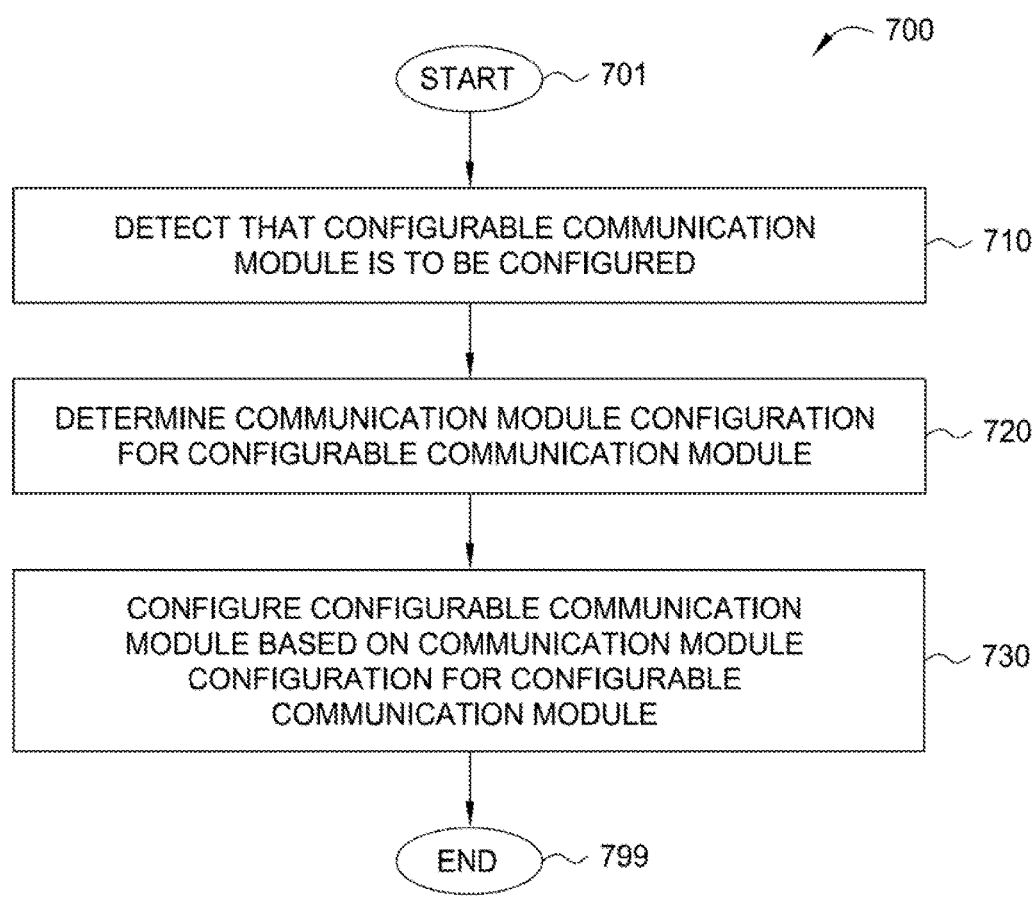
FIG. 7 depicts an exemplary embodiment of a method by which a configurable communication module of an energy-limited wireless node is configured.

FIG. 7 depicts an exemplary embodiment of a method by which a configurable communication module of an energy-limited wireless node is configured. It will be appreciated that the steps of method 700 may be performed by a controller of the energy-limited wireless node. It will be appreciated that, while primarily presented as being performed serially, at least a portion of the steps of method 700 may be performed contemporaneously or in a different order than as presented in FIG. 7. At step 701, method 700 begins. At step 710, the energy-limited wireless node detects that the configurable communication module is to be configured. The configurable communication module may be a configurable transmitter (e.g., a CAT, a configurable transmitter, a configurable transmitter function of a main communication module, or the like), a configurable receiver (e.g., a CAR, a configurable receiver, a configurable receiver function of a main communication module, or the like), a configurable communication module supporting transmitter functions and receiver functions, or the like). The detection may be detection of a trigger condition (e.g., a temporal trigger condition, an event, or the like). At step 720, the energy-limited wireless node determines a communication module configuration for the configurable communication module. The energy-limited wireless node may determine a communication module configuration for the configurable communication module locally, based on information received from a network controller, or the like, as well as various combinations thereof. The energy-limited wireless node may determine a communication module configuration for the configurable communication module by selecting a communication module configuration from a set of available communication module configurations. At step 730, the energy-limited wireless node configures the configurable communication module based on the communication module configuration for the configurable communication module. The energy-limited wireless node configures the configurable communication module based on the communication module configuration for the configurable communication module by selecting one or more components of the configurable communication module to be used, configuring one or more components of the configurable communication module to use one or more circuits or functions, configuring one or more components of the configurable communication module to use one or more algorithms, configuring one or more components of the configurable communication module to use one or more parameters, configuring one or more components of the configurable communication module to use one or more parameter values, or the like, as well as various combinations thereof. At step 799, method 700 ends.

Figure 8:
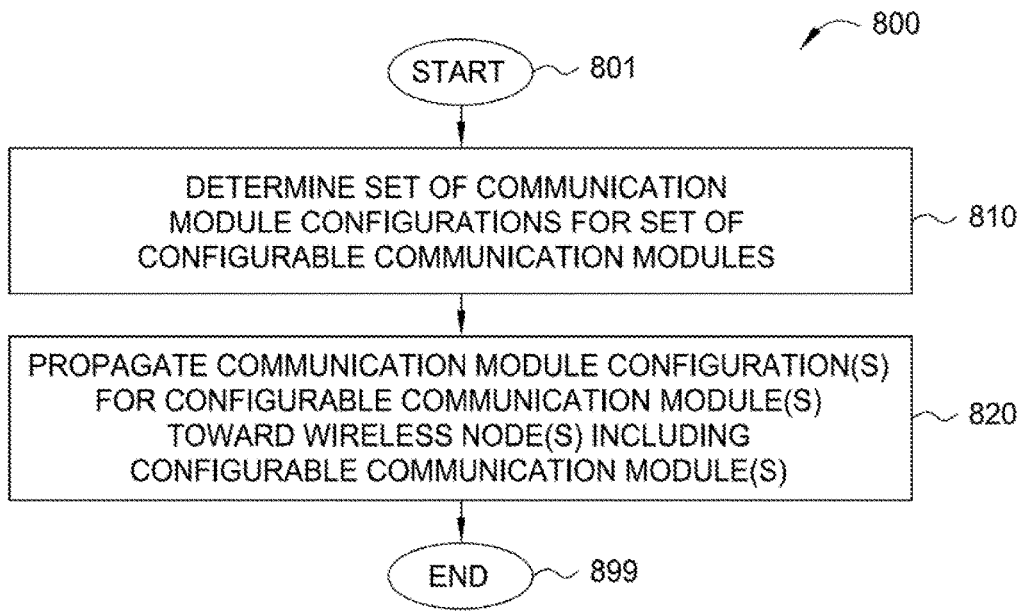
FIG. 8 depicts an exemplary embodiment of a method by which a network controller controls configuration of one or more configurable communication modules of one or more energy-limited wireless nodes.

FIG. 8 depicts an exemplary embodiment of a method by which a network controller controls configuration of one or more configurable communication modules of one or more energy-limited wireless nodes. It will be appreciated that, while primarily presented as being performed serially, at least a portion of the steps of method 800 may be performed contemporaneously or in a different order than as presented in FIG. 8. At step 801, method 800 begins. At step 810, the network controller determines a set of communication module configurations for a set of configurable communication modules, respectively. The set of configurable communication modules may include one or more communication modules. The set of configurable communication modules may include configurable communication modules of one or more energy-limited wireless nodes (e.g., a receiver configuration of a configurable receiver of an energy-limited wireless node, multiple receiver configurations of multiple receivers of an energy-limited wireless node, multiple receiver configurations of multiple receivers across multiple energy-limited wireless nodes, a transmitter configuration of a configurable transmitter of an energy-limited wireless node, multiple transmitter configurations of multiple transmitters of an energy-limited wireless node, multiple transmitter configurations of multiple transmitters across multiple energy-limited wireless nodes, one or more transmitter-receiver configuration pairs for one or more transmitter-receiver pairs of one or more pairs of energy-limited wireless nodes, receiver configurations for all configurable receivers of the wireless network, transmitter configurations for all configurable transmitters of the wireless network, transmitter and receiver configurations for all configurable transmitters and receivers of the wireless network, or the like, as well as various combinations thereof). At step 820, the network controller propagates the communication module configuration(s) toward the energy-limited wireless nodes(s) including the configurable communication module(s) with which the communication module configuration(s) are associated, respectively. At step 899, method 800 ends.

Figure 9:
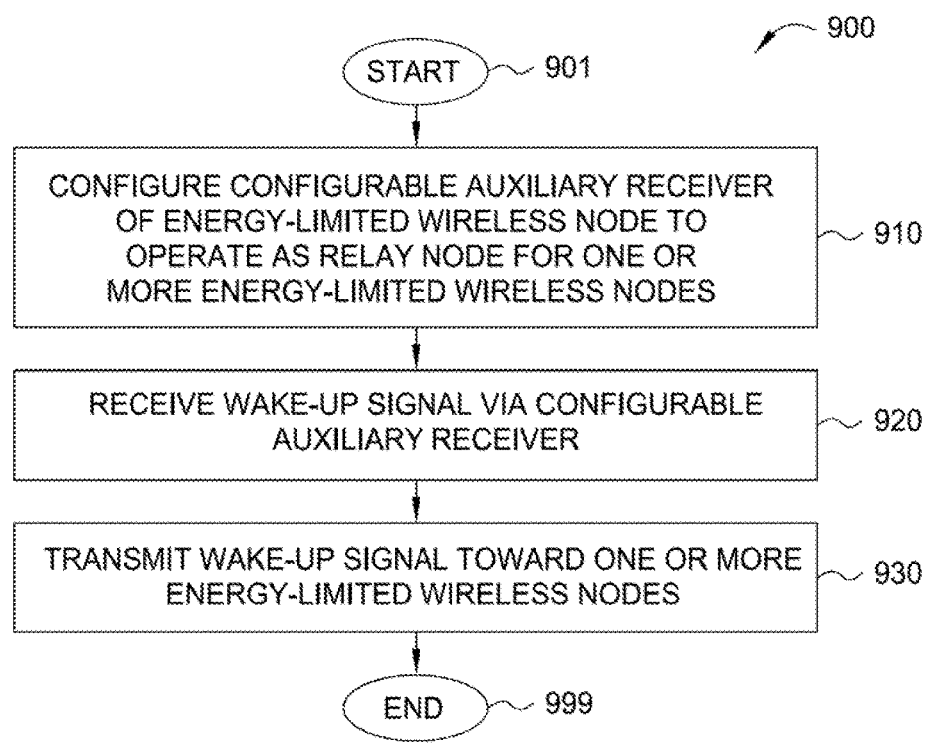
FIG. 9 depicts an exemplary embodiment of a method by which an energy-limited wireless node operates as a relay for forwarding a wake-up signal to one or more energy-limited wireless nodes.

FIG. 9 depicts an exemplary embodiment of a method by which an energy-limited wireless node operates as a relay for forwarding a wake-up signal to one or more energy-limited wireless nodes. It will be appreciated that, while primarily presented as being performed serially, at least a portion of the steps of method 900 may be performed contemporaneously or in a different order than as presented in FIG. 9. At step 901, method 900 begins. At step 910, a configurable auxiliary receiver of the energy-limited wireless node is configured to operate as a relay node for the one or more energy-limited wireless nodes. This may include configuration of a configurable auxiliary receiver of the energy-limited wireless node to use a first receiver power and configuration of respective configurable auxiliary receivers of the one or more energy-limited wireless nodes to operate using respective receiver powers that are less than the first receiver power. At step 920, the energy-limited wireless node receives a wake-up signal via the configurable auxiliary receiver of the energy-limited wireless node. At step 930, the energy-limited wireless node transmits the wake-up signal toward one or more energy-limited wireless nodes. The energy-limited wireless node may transmit the wake-up signal via a transmitter of the energy-limited wireless node (e.g., a configurable auxiliary transmitter, an auxiliary transmitter, a main communication module including a transmit function, or the like). It will be appreciated that this embodiment may be particularly useful for reducing power consumption for the set of energy-limited wireless nodes since only the energy-limited wireless node that is operating as the relay needs to maintain a receiver power that is sufficient to receive the wake-up signal from the source of the wake-up signal while each of the one or more energy-limited wireless nodes may operate in lower power modes since the one or more energy-limited wireless nodes locally from the energy-limited wireless node that is operating as the relay. At step 999, method 900 ends.

It will be appreciated that, although primarily presented herein with respect to embodiments supporting configuration of communication modules of energy-limited wireless nodes, various embodiments presented herein also may be used for configuration of communication modules of wireless nodes that are not considered to be energy-limited (e.g., wireless nodes which have a permanent power source, such as a wireless access node (e.g., NodeB, eNodeB, or the like), a wireless relay node with a permanent power source, or the like).

It will be appreciated that, although primarily presented herein with respect to embodiments supporting configuration of communication modules of wireless nodes, various embodiments presented herein also may be used for configuration of communication modules of other communication devices which may not communicate wirelessly.

Figure 10:
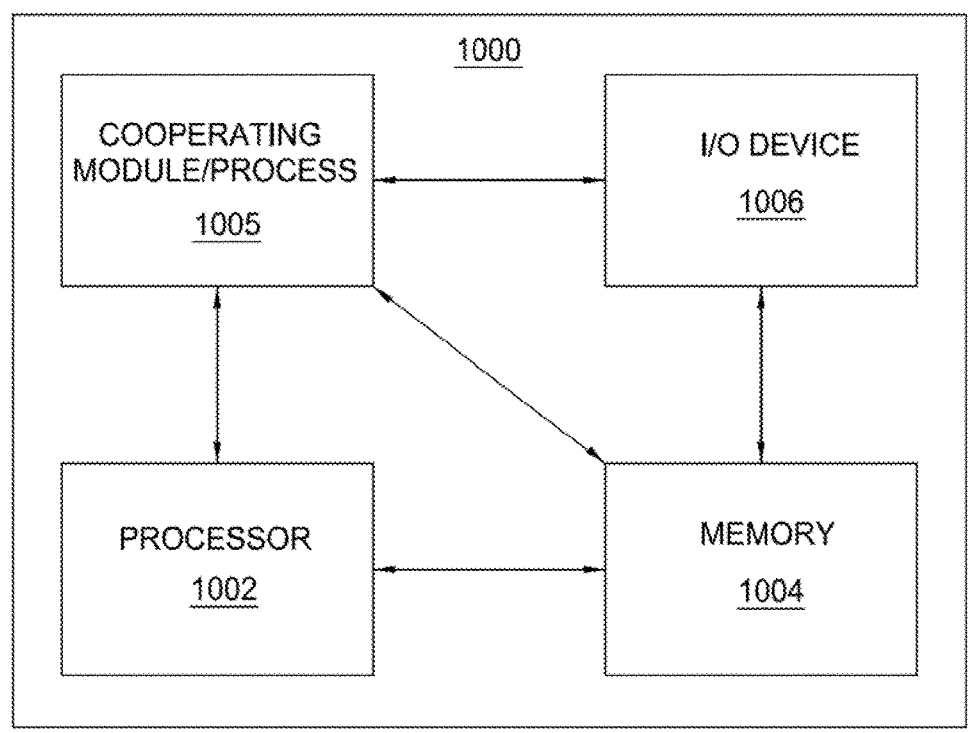
FIG. 10 depicts a high-level block diagram of a computer suitable for use in performing functions described herein.

FIG. 10 depicts a high-level block diagram of a computer suitable for use in performing functions described herein.

The computer 1000 includes a processor 1002 (e.g., a central processing unit (CPU) and/or other suitable processor(s)) and a memory 1004 (e.g., random access memory (RAM), read only memory (ROM), and the like).

The computer 1000 also may include a cooperating module/process 1005. The cooperating process 1005 can be loaded into memory 1004 and executed by the processor 1002 to implement functions as discussed herein and, thus, cooperating process 1005 (including associated data structures) can be stored on a computer readable storage medium, e.g., RAM memory, magnetic or optical drive or diskette, and the like.

The computer 1000 also may include one or more input/output devices 1006 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 1000 depicted in FIG. 10 provides a general architecture and functionality suitable for implementing functional elements described herein and/or portions of functional elements described herein. For example, the computer 1000 provides a general architecture and functionality suitable for implementing one or more of CEWN 110, CWG 120, controller 130, CAR 210, CAT 220, controller 230, CEWN 310, CWG 320, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An energy-limited wireless node, comprising:
   a communication module configured to switch between a sleep mode in which the communication module is not operable to communicate and an active mode in which the communication module is operable to communicate;
   a configurable auxiliary receiver configured to initiate switching of the communication module from the sleep mode to the active mode based on detection of a wake-up signal, wherein the configurable auxiliary receiver comprises a low noise amplifier (LNA) configured to amplify a signal received at the configurable auxiliary receiver, a detector configured to estimate an encoded signal received at the configurable auxiliary receiver, and a decoder configured to decode the encoded signal received at the configurable auxiliary receiver; and
   a controller configured to control configuration of the configurable auxiliary receiver to operate using an auxiliary receiver configuration, wherein the auxiliary receiver configuration comprises at least one of a configuration indication for the LNA or an indication of a detection and decoding algorithm for the detector and the decoder, wherein, to control configuration of the configurable auxiliary receiver to operate using the auxiliary receiver configuration, the controller is configured to receive configuration information indicative of the auxiliary receiver configuration for the configurable auxiliary receiver and provide configuration control information for configuring the configurable auxiliary receiver to operate using the auxiliary receiver configuration.

2. The energy-limited wireless node of claim 1, wherein the auxiliary receiver configuration is determined based on information indicative of a channel gain of the energy-limited wireless node or information indicative of a channel condition of the energy-limited wireless node.

3. The energy-limited wireless node of claim 1, wherein the auxiliary receiver configuration is determined based on a transmitter configuration of a transmitter configured to transmit the wake-up signal to the configurable auxiliary receiver.

4. The energy-limited wireless node of claim 1, wherein the auxiliary receiver configuration is determined based on at least one of:
   a link-level performance objective for a wireless link between the configurable auxiliary receiver and a transmitter configured to transmit the wake-up signal to the configurable auxiliary receiver; or
   a network performance objective of a wireless network with which the energy-limited wireless node is associated.

5. The energy-limited wireless node of claim 1, wherein the auxiliary receiver configuration comprises an indication of a receive power to be used by the configurable auxiliary receiver.

6. The energy-limited wireless node of claim 1, wherein the configuration indication for the LNA comprises at least one of:
   an indication of a power level for the LNA; or
   an indication as to whether the LNA is to be used.

7. The energy-limited wireless node of claim 1, wherein the configurable auxiliary receiver further comprises:
   a switch block configured to control whether or not the LNA is used for handling a signal received at the configurable auxiliary receiver.

8. The energy-limited wireless node of claim 1, wherein the configurable auxiliary receiver comprises:
   a switch block configured to control whether or not the detector is used for handling a signal received at the configurable auxiliary receiver.

9. The energy-limited wireless node of claim 1, wherein the controller is configured to control configuration of the configurable auxiliary receiver, to operate using the auxiliary receiver configuration, based on detection of a trigger condition.

10. The energy-limited wireless node of claim 9, wherein the trigger condition comprises at least one of expiration of a timer, a sensed event, a topology change, or receipt of a message.

11. The energy-limited wireless node of claim 9, wherein the trigger condition comprises receipt of a message from a network controller configured to determine the auxiliary receiver configuration for the configurable auxiliary receiver of the energy-limited wireless node.

12. The energy-limited wireless node of claim 1, wherein the controller is configured to control configuration of the configurable auxiliary receiver, to operate using the auxiliary receiver configuration, based on information received from a network controller.

13. The energy-limited wireless node of claim 12, wherein the information received from the network controller comprises at least one of an indication of the auxiliary receiver configuration or information describing the auxiliary receiver configuration.

14. The energy-limited wireless node of claim 1, wherein the controller is configured to control configuration of the configurable auxiliary receiver, to operate using the auxiliary receiver configuration, by selecting the auxiliary receiver configuration from a set of auxiliary receiver configurations.

15. The energy-limited wireless node of claim 1, wherein the controller is configured to detect receipt of a wake-up signal via the configurable auxiliary receiver and to control transmission of the wake-up signal toward a second energy-limited wireless node.

16. The energy-limited wireless node of claim 15, wherein the controller is configured to control transmission of the wake-up signal toward the second energy-limited wireless node via the communication module or via an auxiliary transmitter.

17. The energy-limited wireless node of claim 1, wherein the communication module comprises at least one of a receiver or a transmitter.

18. The energy-limited wireless node of claim 1, wherein the configurable auxiliary receiver and the communication module are part of a combined communication module.

19. The energy-limited wireless node of claim 1, further comprising:
a configurable auxiliary transmitter, wherein the controller is configured to control configuration of the configurable auxiliary transmitter to operate using an auxiliary transmitter configuration.

20. The energy-limited wireless node of claim 19, wherein the auxiliary transmitter configuration comprises at least one of an indication of a transmit power to be used by the configurable auxiliary transmitter or an indication of a signal encoding type to be used by the configurable auxiliary transmitter.

* * * * *